(12) United States Patent
Kim et al.

(10) Patent No.: US 11,736,241 B2
(45) Date of Patent: *Aug. 22, 2023

(54) METHOD AND DEVICE FOR PROCESSING HARQ FEEDBACK IN A MOBILE COMMUNICATION SYSTEM

(71) Applicant: Samsung Electronics Co., Ltd., Suwon-si (KR)

(72) Inventors: Soeng Hun Kim, Suwon-si (KR); Gert-Jan Van Lieshout, Apeldoorn (NL); Aris Papasakellariou, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/465,134

(22) Filed: Sep. 2, 2021

(65) Prior Publication Data

US 2021/0399844 A1 Dec. 23, 2021

Related U.S. Application Data

(63) Continuation of application No. 16/889,078, filed on Jun. 1, 2020, now Pat. No. 11,115,159, which is a
(Continued)

(30) Foreign Application Priority Data

| Oct. 1, 2009 | (KR) | 10-2009-0094004 |
|---|---|---|
| Jan. 19, 2010 | (KR) | 10-2010-0004800 |
| Mar. 16, 2010 | (KR) | 10-2010-0023470 |

(51) Int. Cl.
*H04W 4/00* (2018.01)
*H04L 1/1829* (2023.01)
(Continued)

(52) U.S. Cl.
CPC .......... *H04L 1/1861* (2013.01); *H04L 1/1685* (2013.01); *H04L 1/1812* (2013.01);
(Continued)

(58) Field of Classification Search
CPC ... H04L 5/0023; H04L 1/1812; H04L 5/0037; H04L 5/0094; H04L 5/14; H04L 1/1822;
(Continued)

(56) References Cited

U.S. PATENT DOCUMENTS

| 6,313,863 B1 | 11/2001 | Chida |
| 8,402,336 B2 | 3/2013 | McBeath et al. |

(Continued)

FOREIGN PATENT DOCUMENTS

| EP | 2 104 264 A1 | 9/2009 |
| JP | 08-046973 A | 2/1996 |

(Continued)

OTHER PUBLICATIONS

MCC Support, "Final Report of 3GPP TSG RAN WG1 #56bis v2.0.0 (Seoul, South Korea, Mar. 23-27, 2009)", 3GPP Draft, R1-092199, 3GPP TSG RAN WG1 Meeting #57, San Francisco, USA, May 4, 2009, XP050339210.
(Continued)

*Primary Examiner* — Phuc H Tran
(74) *Attorney, Agent, or Firm* — Jefferson IP Law, LLP

(57) ABSTRACT

A device and method for handling HARQ feedback in a mobile communication system are disclosed. The HARQ feedback handling method includes: analyzing a control message from a base station to recognize presence of HARQ feedback relationships between downlink carriers and uplink carriers; determining an uplink carrier (a downlink carrier) to support HARQ feedback in response to downlink traffic (uplink traffic) sent through a downlink carrier (an
(Continued)

uplink carrier); and sending (receiving) HARQ feedback through the determined uplink carrier (downlink carrier).

20 Claims, 19 Drawing Sheets

Related U.S. Application Data continuation of application No. 15/926,450, filed on Mar. 20, 2018, now Pat. No. 10,673,578, which is a continuation of application No. 15/354,376, filed on Nov. 17, 2016, now Pat. No. 9,954,652, which is a continuation of application No. 13/499,741, filed as application No. PCT/KR2010/006717 on Oct. 1, 2010, now Pat. No. 9,531,506.

(51) Int. Cl.
| | |
|---|---|
| *H04L 1/1607* | (2023.01) |
| *H04L 1/1812* | (2023.01) |
| *H04L 1/1867* | (2023.01) |
| *H04W 72/1268* | (2023.01) |
| *H04W 72/23* | (2023.01) |

(52) U.S. Cl.
CPC ....... *H04L 1/1896* (2013.01); *H04W 72/1268* (2013.01); *H04W 72/23* (2023.01)

(58) Field of Classification Search
CPC ... H04L 27/2602; H04L 41/08; H04L 5/0044; H04L 5/0073; H04L 5/0078; H04L 1/0061; H04L 5/0035; H04L 5/0016; H04L 5/0098; H04L 1/1819; H04L 1/1896; H04L 27/26; H04L 5/0048; H04L 5/0057; H04L 1/0072; H04L 1/18; H04L 1/1887; H04L 5/0007; H04L 5/0032; H04L 5/0039; H04L 5/0041; H04L 5/0046; H04L 5/0051; H04L 5/0058
See application file for complete search history.

(56) References Cited

U.S. PATENT DOCUMENTS

| | | | |
|---|---|---|---|
| 8,441,996 B2 | 5/2013 | Kim et al. | |
| 8,630,248 B2 | 1/2014 | Seo et al. | |
| 8,634,358 B2 | 1/2014 | Damnjanovic et al. | |
| 8,665,775 B2 | 3/2014 | Kim et al. | |
| 8,681,728 B2 | 3/2014 | Jung et al. | |
| 8,767,585 B2 | 7/2014 | Pelletier et al. | |
| 8,804,586 B2 | 8/2014 | Fong et al. | |
| 8,811,262 B2 | 8/2014 | Chung et al. | |
| 9,049,630 B2 | 6/2015 | Chin et al. | |
| 10,187,894 B1 | 1/2019 | Naim et al. | |
| 10,863,511 B2* | 12/2020 | Cheng | H04W 48/16 |
| 2009/0238128 A1 | 9/2009 | Park et al. | |
| 2010/0070814 A1 | 3/2010 | Damnjanovic et al. | |
| 2010/0110960 A1 | 5/2010 | Kim et al. | |
| 2011/0243034 A1 | 10/2011 | Yamada et al. | |
| 2011/0261763 A1 | 10/2011 | Chun et al. | |
| 2011/0305197 A1 | 12/2011 | Park et al. | |
| 2011/0317577 A1 | 12/2011 | Yamada et al. | |
| 2012/0002568 A1 | 1/2012 | Tiirola et al. | |
| 2012/0026935 A1 | 2/2012 | Park et al. | |
| 2012/0069795 A1 | 3/2012 | Chung et al. | |
| 2012/0093082 A1 | 4/2012 | Kim et al. | |
| 2012/0099441 A1 | 4/2012 | Jung et al. | |
| 2012/0099555 A1 | 4/2012 | Yoshii et al. | |
| 2012/0113941 A1 | 5/2012 | Chung et al. | |
| 2012/0113942 A1 | 5/2012 | Kim | |
| 2012/0147734 A1 | 6/2012 | Kim et al. | |
| 2012/0188963 A1 | 7/2012 | Iwamura et al. | |
| 2013/0010619 A1 | 1/2013 | Fong et al. | |
| 2013/0153298 A1 | 6/2013 | Pietraski et al. | |
| 2015/0296509 A1* | 10/2015 | Yang | H04L 27/26 370/336 |
| 2016/0381681 A1* | 12/2016 | Nogami | H04L 5/1469 370/280 |
| 2019/0313429 A1* | 10/2019 | Cheng | H04W 88/023 |
| 2021/0112578 A1* | 4/2021 | Yang | H04L 1/1896 |
| 2021/0219336 A1* | 7/2021 | Fan | H04W 74/04 |
| 2022/0086867 A1* | 3/2022 | Papasakellariou | H04L 5/0044 |
| 2022/0116978 A1* | 4/2022 | Takahashi | H04L 5/0094 |

FOREIGN PATENT DOCUMENTS

| | | |
|---|---|---|
| JP | 2003-274376 A | 9/2003 |
| KR | 10-2007-0105287 A | 10/2007 |

OTHER PUBLICATIONS

Extended European Search Report dated Aug. 2, 2022, issued in European Patent Application No. 22172591.4.
NEC Group, "Downlink ACK/NACK signalling for E-UTRA", 3GPP TSG RAN WG1 Meeting #50, R1-073459, Aug. 20-24, 2007.
LG Electronics, "Mapping Relations between UL VRB and DL ACK/NACK", 3GPP TSG RAN WG1 Meeting #50, R1-073479, Aug. 20-24, 2007.
NEC Group, "DL Multiplexing for Persistent and Dynamic scheduling", 3GPP TSG RAN WG1 Meeting #50, R1-073460, Aug. 20-24, 2007.
LG Electronics, Issues on DL/UL Control Signalling in Asymmetric Carrier Aggregation, 3GPP TSG RAN WG1 Meeting #58, R1-093252, Aug. 18, 2009, Shenzhen, China.
NEC Group, PHICH carrier linkage for carrier aggregation, 3GPP TSG RAN WG1 Meeting #58, R1-093227, Shenzhen, China, Aug. 18, 2009.
Interdigital Communications, LLC, Cross Carrier Operation for Bandwidth Extension, 3GPP TSG RAN WG1 Meeting #58, R1-093067, Shenzhen, China, Aug. 17, 2009.
Samsung, "UL ACK/NAK Transmission in LTE-A", 3GPP Draft, R1-091877, UL ACK NAK, 3rd Generation Partnership Project (3GPP), Mobile Competence Centre, 650, Route Des Lucioles, F-06921, Sophia-Antipolis Cedex, France, San Francisco, USA 20090428, Apr. 28, 2009, XP050339371.
European Office Action dated Feb. 14, 2023, issued in European Patent Application No. 22172591.4.

* cited by examiner

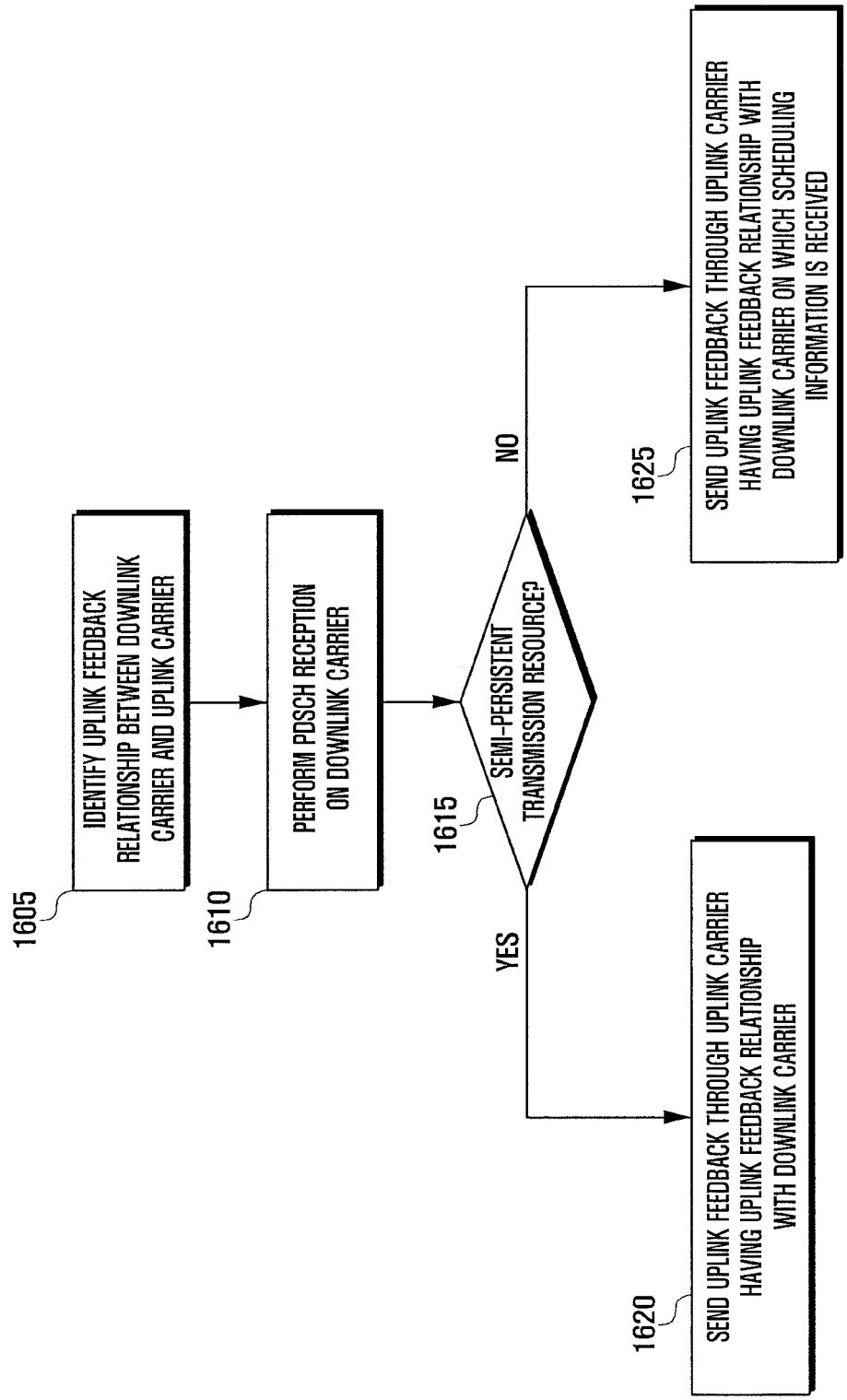

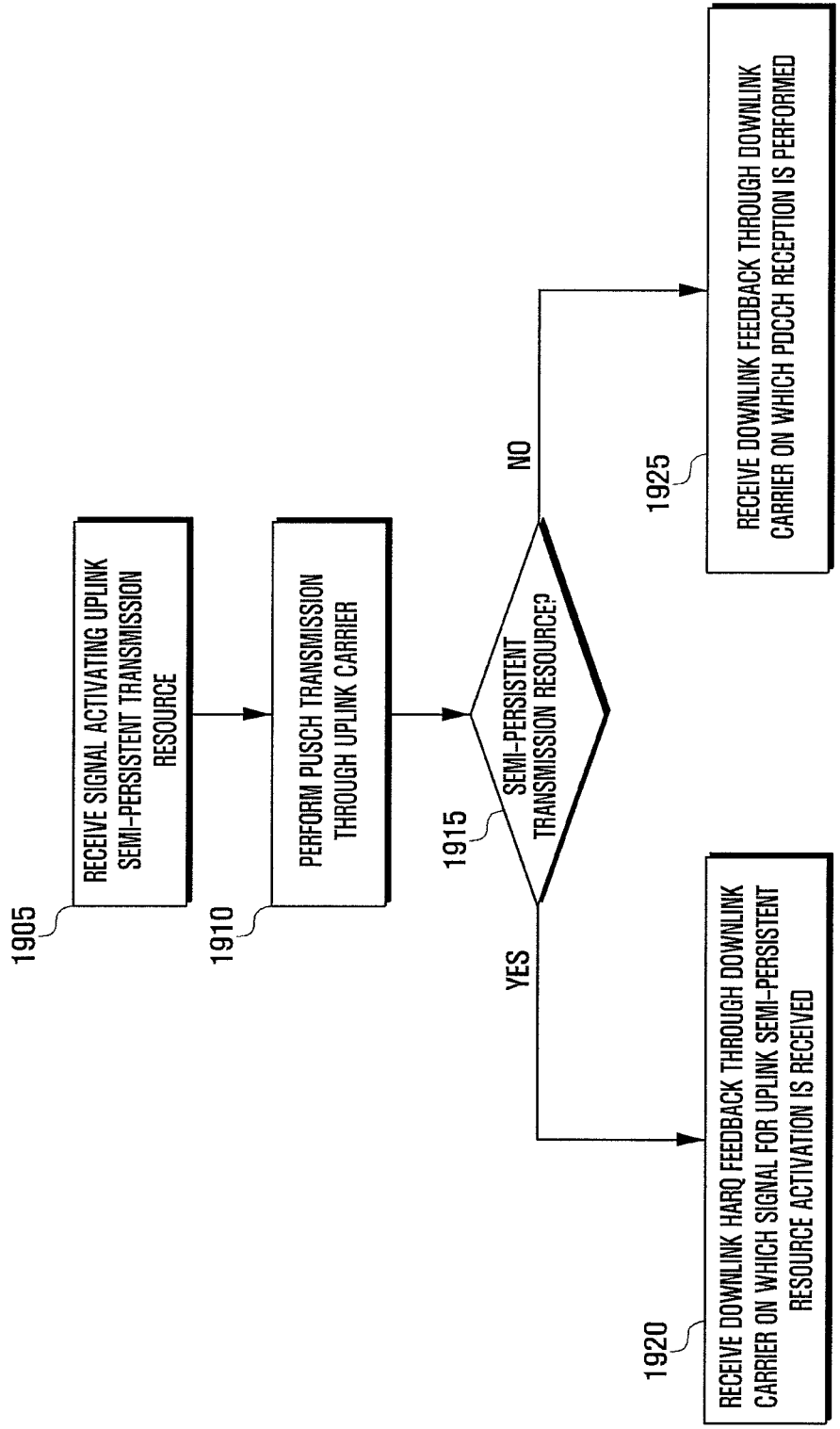

METHOD AND DEVICE FOR PROCESSING HARQ FEEDBACK IN A MOBILE COMMUNICATION SYSTEM

CROSS-REFERENCE TO RELATED APPLICATION(S)

This application is a continuation application of prior application Ser. No. 16/889,078, filed on Jun. 1, 2020, which is a continuation application of prior application Ser. No. 15/926,450, filed on Mar. 20, 2018, and has issued as U.S. Pat. No. 10,673,578 on Jun. 2, 2020, which is a continuation application of prior application Ser. No. 15/354,376, filed on Nov. 17, 2016, and has issued as U.S. Pat. No. 9,954,652 on Apr. 24, 2018, which is a continuation application of prior application Ser. No. 13/499,741, filed on May 15, 2012, and has issued as U.S. Pat. No. 9,531,506 on Dec. 27, 2016, which is a U.S. National Stage application under 35 U.S.C. § 371 of an International application number PCT/KR2010/006717, filed on Oct. 1, 2010, which is based on and claimed the priority of a Korean patent application number 10-2009-0094004, filed on Oct. 1, 2009, in the Korean Intellectual Property Office, of a Korean patent application number 10-2010-0004800, filed on Jan. 19, 2010, in the Korean Intellectual Property Office, and of a Korean patent application number 10-2010-0023470, filed on Mar. 16, 2010, in the Korean Intellectual Property Office, the disclosure of each of which is incorporated by reference herein in its entirety.

TECHNICAL FIELD

The present invention relates to a device and method for handling HARQ feedback in a mobile communication system and, more particularly, to a device and method for handling HARQ feedback for a user equipment utilizing multiple aggregated carriers.

BACKGROUND ART

In general, mobile communication systems have been developed to provide communication services to users in motion. Thanks to rapid technological advancement, mobile communication systems are capable of providing not only voice communication services but also high-speed data communication services.

Recently, 3GPP has been working to standardize specifications for the Long Term Evolution (LTE) system, which is regarded as a next generation mobile communication system. The LTE system is expected to be commercially available in 2010, and aims to realize high-speed packet based communication supporting a data rate of 100 Mbps exceeding existing data rates. With completion of LTE system standardization, to achieve higher data rates, 3GPP started to develop the LTE-Advanced (LTE-A) system by introducing various new communication schemes to the LTE system.

Carrier aggregation (CA) is a representative one of the communication schemes to be newly introduced. Unlike an existing user equipment that uses one downlink carrier and one uplink carrier for data transmission and reception, a user equipment supporting carrier aggregation may use multiple downlink carriers and multiple uplink carriers. To support carrier aggregation involving multiple downlink carriers and multiple uplink carriers, some functions of the user equipment (UE) and the base station (Node B) must be changed. The HARQ (hybrid automatic repeat request) scheme is one of such functions. In HARQ, when data is received from a base station, a user equipment may perform error correction operation on the received data and detect errors using a simple scheme like cyclic redundancy check (CRC) to determine necessity of retransmission. If retransmission is necessary, the user equipment sends a retransmission request to the base station through the uplink channel. However, in the event that carrier aggregation involving multiple carriers is employed, it is necessary to determine, in response to traffic having received through one carrier, another carrier through which HARQ feedback is to be sent.

DISCLOSURE OF INVENTION

Technical Problem

The present invention is to provide a method and device that enable a user equipment using multiple aggregated carriers to report uplink power headroom in a mobile communication system.

Solution to Problem

According to a first embodiment of the present invention, an HARQ feedback handling method in a mobile communication system may include: analyzing a control message from a base station to recognize presence of HARQ feedback relationships between downlink carriers and uplink carriers; and sending, when the PDCCH of a first downlink carrier is used to carry downlink resource allocation information for a second downlink carrier, uplink HARQ feedback on an uplink carrier having an uplink feedback relationship with a downlink carrier on which PDSCH transmission is performed.

According to a second embodiment of the present invention, an HARQ feedback handling method in a mobile communication system may include: analyzing a control message from a base station to recognize presence of HARQ feedback relationships between downlink carriers and uplink carriers; and sending, when a first downlink carrier is used to carry resource allocation information of a second downlink carrier, HARQ feedback through an uplink carrier having an uplink feedback relationship with a downlink carrier on which the resource allocation information is received.

According to a third embodiment of the present invention, an HARQ feedback handling method in a mobile communication system may include: analyzing a control message from a base station to recognize presence of HARQ feedback relationships between downlink carriers and uplink carriers; and receiving, when the PDCCH of a downlink carrier is used to carry uplink resource allocation information for an uplink carrier, downlink HARQ feedback on a downlink carrier on which the uplink resource allocation information is received.

According to a fourth embodiment of the present invention, an HARQ feedback handling method in a mobile communication system may include: analyzing a control message from a base station to recognize presence of HARQ feedback relationships between downlink carriers and uplink carriers; and receiving, when the PDCCH of a downlink carrier is used to carry uplink resource allocation information for an uplink carrier, downlink HARQ feedback on a downlink carrier having a downlink feedback relationship with an uplink carrier on which uplink traffic is sent.

According to a fifth embodiment of the present invention, an HARQ feedback handling method in a mobile communication system may include: recognizing an uplink HARQ feedback relationship between downlink carriers and uplink carriers; and sending, when PDSCH reception is performed through semi-persistent transmission resources, uplink HARQ feedback through an uplink carrier having an uplink feedback relationship with a downlink carrier on which PDSCH reception is performed.

According to a sixth embodiment of the present invention, an HARQ feedback handling method in a mobile communication system may include: recognizing a downlink carrier to receive downlink feedback at the time of configuring semi-persistent transmission resources; and receiving, when PUSCH transmission is performed through semi-persistent transmission resources, downlink HARQ feedback through the downlink carrier recognized at the time of configuring semi-persistent transmission resources.

According to a seventh embodiment of the present invention, an HARQ feedback handling method in a mobile communication system may include: recognizing mappings between downlink carriers and uplink carriers; and receiving, when PUSCH transmission is performed through semi-persistent transmission resources, downlink HARQ feedback on a downlink carrier associated in path loss with an uplink carrier on which the PUSCH transmission is performed.

According to an eighth embodiment of the present invention, an HARQ feedback handling method in a mobile communication system may include receiving, when PUSCH transmission is performed through semi-persistent transmission resources, HARQ feedback on a downlink carrier through which a signal activating the semi-persistent transmission resources has been received. In the method, after receiving a signal activating semi-persistent transmission resources through the PDCCH, the user equipment periodically performs PUSCH transmission through the activated semi-persistent transmission resources. When performing PUSCH transmission through separate semi-persistent transmission resources, the user equipment receives HARQ feedback on a downlink carrier through which a signal activating the semi-persistent transmission resources has been received.

According to a ninth embodiment of the present invention, an HARQ feedback handling method in a mobile communication system may include: performing PUSCH transmission on an uplink carrier; and receiving HARQ feedback on a downlink carrier selected according to the same criterion regardless of whether the uplink transmission is conducted through transmission resources dynamically allocated by the PDCCH or through semi-persistent transmission resources.

According to another embodiment of the present invention, an HARQ feedback handling device for a user equipment in a mobile communication system may include: a transceiver unit performing uplink transmission and downlink reception to and from a base station; a control message handler determining a downlink carrier to receive downlink feedback on the basis of a control message received by the transceiver unit; a control unit controlling the transceiver unit to receive uplink resource allocation information and to send uplink data according to the uplink resource allocation information; and an HARQ feedback carrier determiner controlling the transceiver unit to receive, in response to uplink transmission performed under control of the control message handler and the control unit, downlink HARQ feedback through a downlink carrier that is used to receive the uplink resource allocation information.

Advantageous Effects of Invention

In a mobile communication system employing carrier aggregation, a user equipment using multiple downlink and uplink carriers can perform HARQ operation without errors.

BRIEF DESCRIPTION OF THE DRAWINGS

FIG. 16 is a flowchart illustrating UE operation according to a fifth embodiment of the present invention.
FIG. 19 is a flowchart illustrating UE operation according to an eighth embodiment of the present invention.

MODE FOR THE INVENTION

Figure 1:
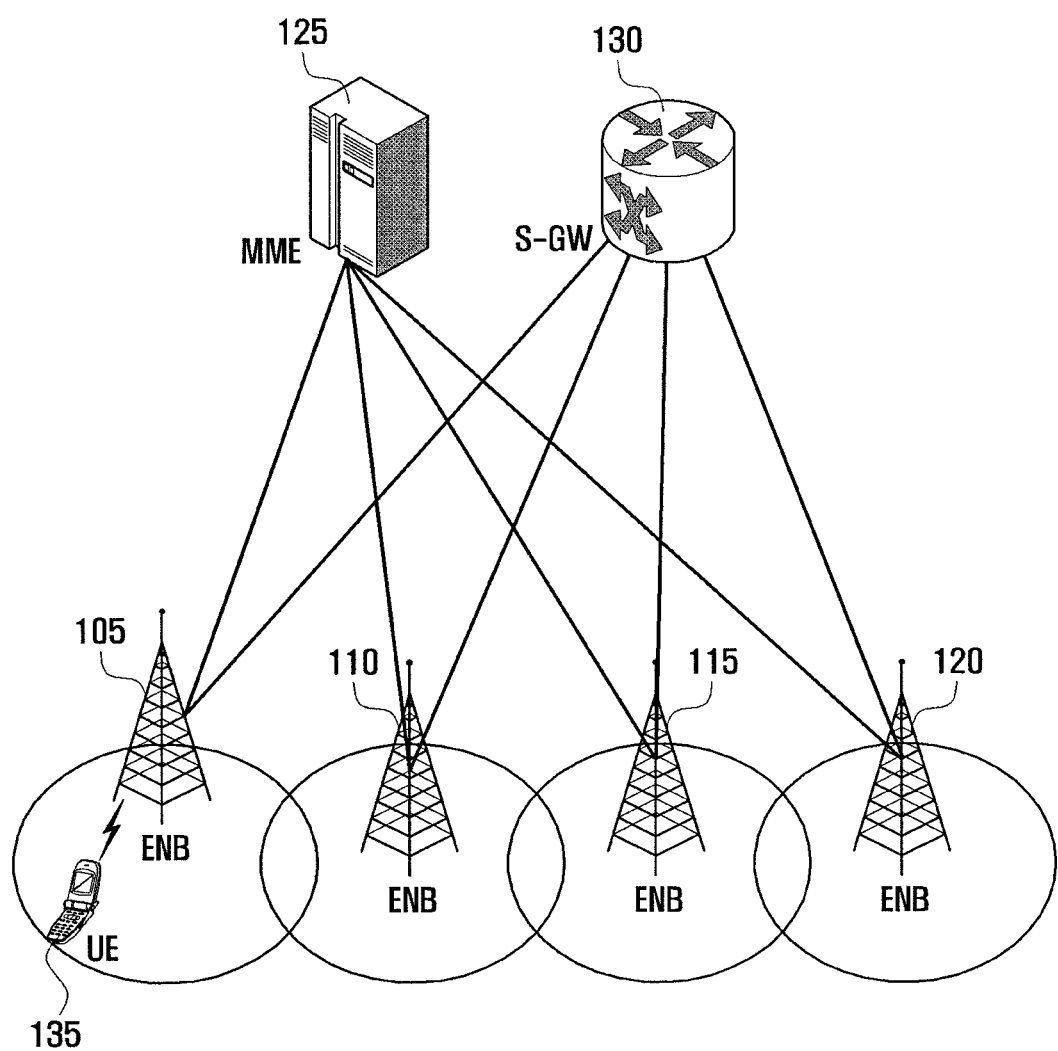
FIG. 1 illustrates an LTE system architecture.

Hereinafter, exemplary embodiments of the present invention will be described with reference to the accompanying drawings.

Embodiments of the present invention relate to a method and device that enable a user equipment using multiple aggregated carriers to report uplink power headroom.

A base station may assign a greater number of carriers to a user equipment employing carrier aggregation, and the user equipment may send and receive data by simultaneously using multiple carriers. This may correspond to a case where the user equipment sends and receives data to and from multiple cells in parallel. Hence, the maximum data rate may increase in proportion to the number of aggregated carriers, and the user equipment may perform data transmission at a significantly higher rate. In a mobile communication system employing carrier aggregation, embodiments of the present invention relate to a method and device that enable a user equipment utilizing multiple downlink carriers and multiple uplink carriers to determine, in response to traffic received on a first carrier, a second carrier on which HARQ feedback is to be sent.

In addition, embodiments of the present invention relate to a mapping between traffic and HARQ feedback when cross carrier scheduling, in which resource allocation information and traffic are sent on different carriers, is employed in particular. Embodiments of the present invention relate further to a method for controlling uplink feedback transmission and downlink feedback reception according to semi-persistency of transmission resources.

In the present invention, nine embodiments are provided as follows.

The first embodiment of the present invention provides a method for determining, when cross scheduling among downlink carriers is conducted, an uplink carrier supporting uplink HARQ feedback. In the method of the first embodiment, when the PDCCH of a first downlink carrier is used to carry downlink resource allocation information for a second downlink carrier, the uplink HARQ feedback is sent on an uplink carrier having an uplink feedback relationship with a downlink carrier on which PDSCH transmission is performed.

In the second embodiment of the present invention, when the PDCCH of a first downlink carrier is used to carry downlink resource allocation information for a second downlink carrier, the uplink HARQ feedback is sent on an uplink carrier having an uplink feedback relationship with a downlink carrier on which PDCCH reception is performed. In other words, when a first downlink carrier is used to carry PDSCH scheduling information of a second downlink carrier, the user equipment sends feedback through an uplink carrier having an uplink feedback relationship with a downlink carrier on which resource allocation information is received.

The third embodiment of the present invention provides a method for determining, when cross scheduling among uplink carriers is conducted, a downlink carrier supporting downlink HARQ feedback. In the method of the third embodiment, when the PDCCH of a downlink carrier is used to carry uplink resource allocation information for an uplink carrier, the downlink HARQ feedback is sent on a downlink carrier on which the uplink resource allocation information is sent.

The fourth embodiment of the present invention provides a method for determining, when cross scheduling among uplink carriers is conducted, a downlink carrier supporting downlink HARQ feedback. In the method of the fourth embodiment, when the PDCCH of a downlink carrier is used to carry uplink resource allocation information for an uplink carrier, the downlink HARQ feedback is sent on a downlink carrier having a downlink feedback relationship with an uplink carrier on which uplink traffic is sent.

In the fifth embodiment of the present invention, when PDSCH transmission and reception is performed through semi-persistent transmission resources without PDCCH operation, the user equipment sends HARQ feedback through an uplink carrier having an uplink feedback relationship with a carrier on which PDSCH reception is performed.

The sixth embodiment of the present invention provides a method for determining, when PUSCH transmission is performed through semi-persistent uplink transmission resources, a downlink carrier supporting downlink HARQ feedback. In the method of the sixth embodiment, when PUSCH transmission is performed through semi-persistent transmission resources, the user equipment receives downlink HARQ feedback through the PDCCH of a downlink carrier preset at the time of configuring semi-persistent transmission resources.

The seventh embodiment of the present invention provides a method wherein, when PUSCH transmission is performed through semi-persistent transmission resources, HARQ feedback is received on a downlink carrier associated in path loss with an uplink carrier in which the semi-persistent transmission resources are configured.

The eighth embodiment of the present invention provides a method wherein, when PUSCH transmission is performed through semi-persistent transmission resources, HARQ feedback is received on a downlink carrier through which a signal activating the semi-persistent transmission resources has been received. After receiving a signal activating semi-persistent transmission resources through the PDCCH, the user equipment periodically performs PUSCH transmission through the activated semi-persistent transmission resources. When performing PUSCH transmission through separate semi-persistent transmission resources, the user equipment receives HARQ feedback on a downlink carrier through which a signal activating the semi-persistent transmission resources has been received.

The ninth embodiment of the present invention provides a method wherein, when PUSCH transmission is performed on an uplink carrier, the user equipment receives HARQ feedback on a downlink carrier selected according to the same criterion regardless of whether the uplink transmission is conducted through transmission resources dynamically allocated by the PDCCH or through semi-persistent transmission resources.

Before a description of the embodiments (the first to ninth embodiments) of the present invention, the architecture and operation of the LTE mobile communication system employing carrier aggregation are described with reference to FIGS. 1, 2 and 3. FIG. 1 illustrates an LTE system architecture.

Referring to FIG. 1, an LTE radio access network is composed of base stations (Evolved Node B, Node B, or ENB) 105, 110, 115 and 120, a mobility management entity (MME) 125, and a serving-gateway (S-GW) 130. A user equipment (UE) 135 may connect to an external network through the ENBs 105 to 120 and the S-GW 130.

The ENBs 105 to 120 correspond to Node Bs of the UMTS system. The ENB is connected to the user equipment 135 through a wireless channel, and may perform more complex functions in comparison to the existing Node B. In the LTE system, as all user traffic including real-time services like VoIP (Voice over IP) services is served by shared channels, it is necessary to perform scheduling on the basis of status information collected from user equipments. Each of the ENBs 105 to 120 performs this scheduling function. In most cases, a single ENB controls multiple cells. To achieve a data rate of up to 100 Mbps, the LTE system utilizes orthogonal frequency division multiplexing (OFDM) in a 20 MHz bandwidth as radio access technology. The LTE system employs adaptive modulation and coding (AMC) to determine the modulation scheme and channel coding rate according to channel states of a user equipment. The S-GW 130 provides data bearers, and creates and removes a data bearer under control of the MME 125. The MME 125 performs various control functions, and is connected to multiple ENBs.

Figure 2:
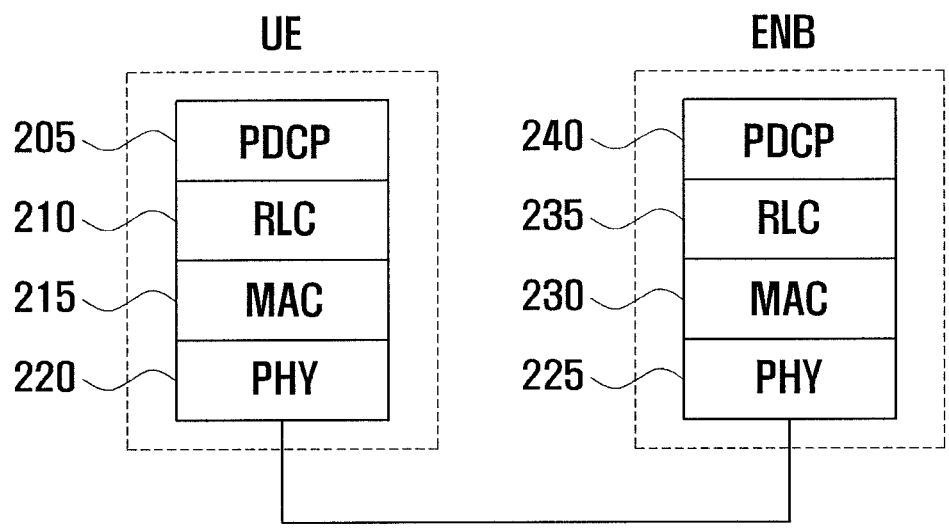
FIG. 2 illustrates a hierarchy of wireless protocols in the LTE system.

FIG. 2 illustrates a hierarchy of wireless protocols in the LTE system.

Referring to FIG. 2, in the LTE system, the wireless protocol stack is composed of a PDCP (Packet Data Convergence Protocol) layer 205 or 240, an RLC (Radio Link Control) layer 210 or 235, a MAC (Medium Access Control) layer 215 or 230, and a physical (PHY) layer 220 or 225. The PDCP layer 205 or 240 performs compression and decompression of IP headers. The RLC layer 210 or 235 reconfigures PDCP PDUs (Protocol Data Unit) to a suitable size to conduct ARQ operations. The MAC layer 215 or 230 is connected to multiple RLC layer devices in a user equipment, and multiplexes RLC PDUs into MAC PDUs or demultiplexes MAC PDUs into RLC PDUs. The physical layer 220 or 225 converts higher layer data into OFDM symbols by means of channel coding and modulation and transmits the OFDM symbols through a wireless channel, or converts OFDM symbols received through a wireless channel into higher layer data by means of demodulation and channel decoding and forwards the data to higher layers. At the transmitting side, for a given protocol layer, an SDU (Service Data Unit) refers to a unit data that the protocol layer inputs from a higher layer, and a PDU refers to a unit data that the protocol layer outputs to a lower layer.

Figure 3:
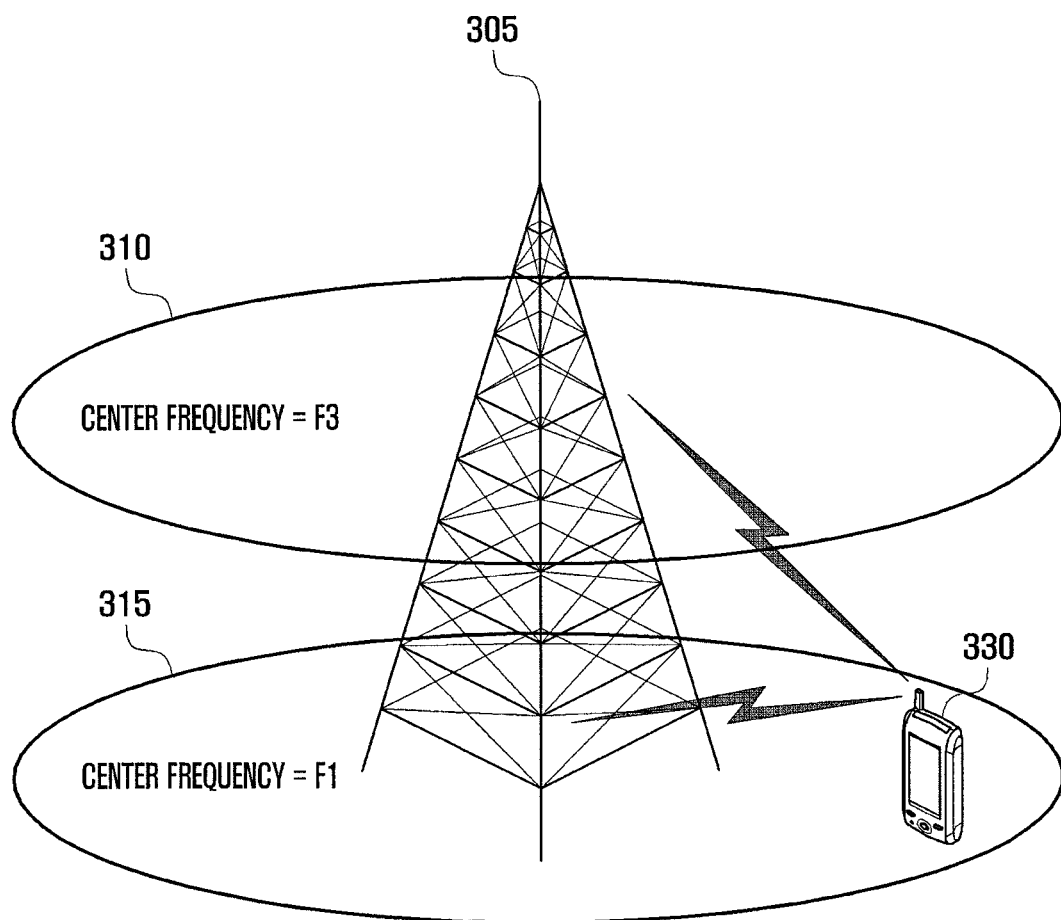
FIG. 3 illustrates carrier aggregation in the LTE system.

FIG. 3 illustrates carrier aggregation in the LTE system.

Referring to FIG. 3, one ENB 305 transmits and receives signals through multiple carriers across multiple frequency bands. For example, assume that the ENB 305 uses a carrier 315 with a center frequency f1 and a carrier 310 with a center frequency f3. A user equipment not supporting carrier aggregation uses one of the two carriers 310 and 315 to send and receive data. A user equipment 330 having a carrier aggregation capability may use multiple carriers including the carriers 310 and 315 in parallel to send and receive data. Here, the ENB 305 may assign two or more carriers to the user equipment 330 having a carrier aggregation capability according to service conditions, increasing the data rate of the user equipment 330. In a traditional sense, it may be considered that one cell is formed of a downlink carrier and an uplink carrier provided by the same base station. In carrier aggregation, a user equipment may be considered as sending and receiving data through multiple cells in parallel. Hence, the maximum data rate of the user equipment may be increased in proportion to the number of aggregated carriers.

The present invention relates to a method and device that enables a user equipment, which performs communication using multiple downlink carriers and multiple uplink carriers in a communication system providing multiple downlink carriers and multiple uplink carriers, to determine, for traffic received on a first carrier, a second carrier on which HARQ feedback is to be sent. In particular, the present invention relates to a mapping between traffic and HARQ feedback when resource allocation information and traffic are sent on different carriers (cross carrier scheduling).

Figure 4:
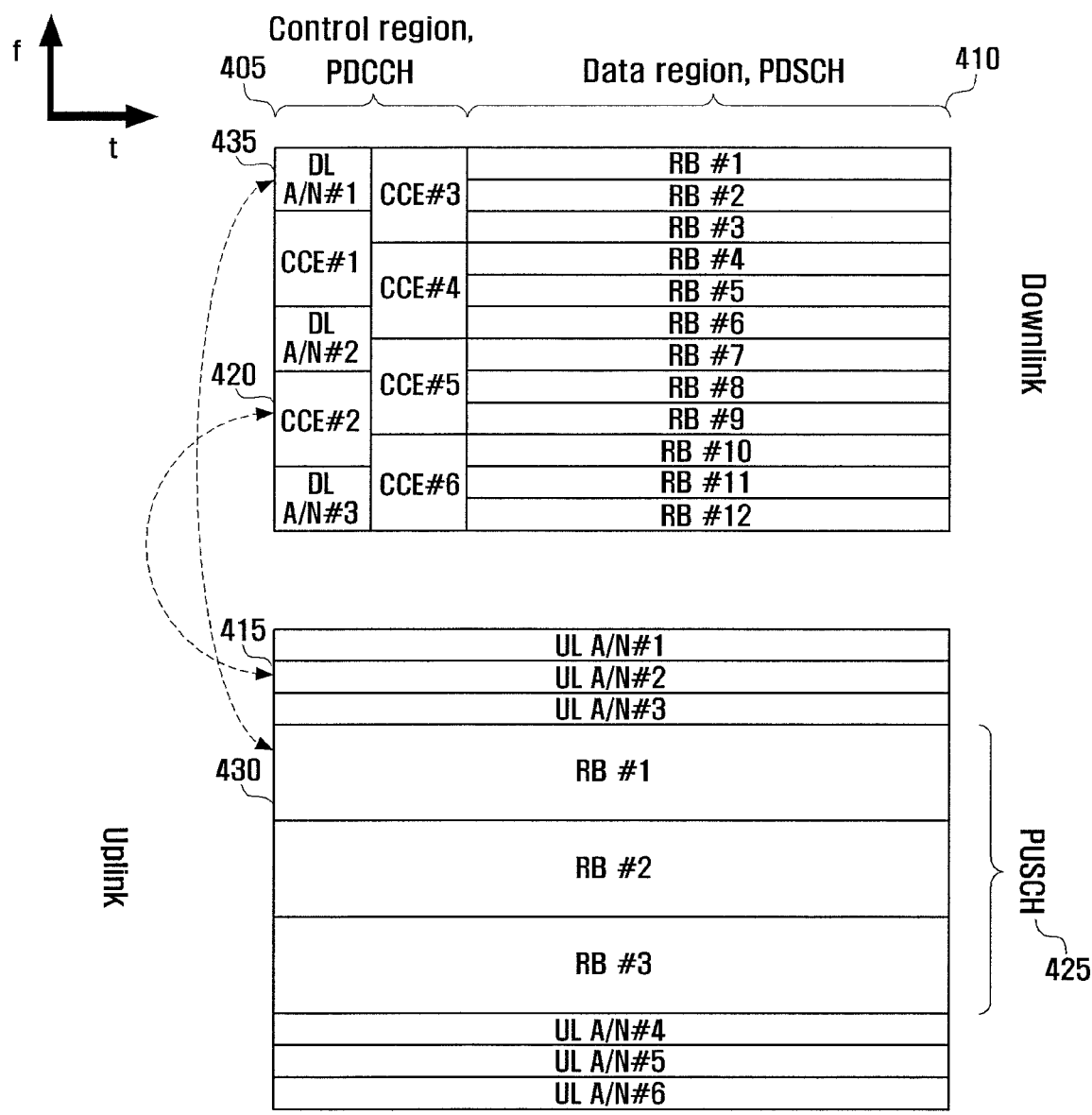
FIG. 4 illustrates a resource configuration for HARQ feedback in the LTE system.

FIG. 4 illustrates a mapping between traffic and HARQ feedback when a single carrier is used.

In FIG. 4, the x-axis indicates time and the y-axis indicates frequencies. When a user equipment uses a downlink (DL) carrier and an uplink (UL) carrier, HARQ feedback for data traffic received on one carrier is sent on the other carrier. HARQ feedback transmission resources are reserved in given regions in advance. The downlink carrier includes a PDCCH (physical downlink control channel) 405 acting as a control region to carry control information such as downlink control information (DCI) and HARQ feedback, and a PDSCH (physical downlink shared channel) 410 acting as a control region to carry downlink data.

The PDCCH 405 is composed of transmission resources including control channel elements (CCE) to carry DCI, and DL A/Ns (Ack/Nack). DCI may be downlink or uplink resource allocation information, and may be sent through one or more CCEs. Although one downlink carrier may include dozens of CCEs per 1 msec, only six CCEs are shown in FIG. 4 for ease of description. One CCE is mapped to one UL A/N transmission resource. For example, CCE #2 415 is mapped to UL A/N #2 420. Ack/Nack for downlink traffic related to downlink resource allocation information sent through CCE #2 415 is sent through UL A/N #2 420 mapped with CCE #2 415. The uplink carrier includes the same number of UL A/N transmission resources as the number of CCEs present in the paired downlink carrier.

The PDSCH 410 includes a plurality of downlink resource blocks (RB). Downlink resource allocation information sent to a user equipment contains information on downlink resource blocks allocated to the user equipment, and downlink traffic is sent and received through the PDSCH.

The uplink carrier is composed of UL A/N transmission resources and a PUSCH (physical uplink shared channel) 425 to send uplink traffic. The PUSCH 425 includes a plurality of uplink resource blocks, each of which is mapped to one DL A/N transmission resource. For example, uplink RB #1 430 is mapped to DL A/N #1 435. In other words, Ack/Nack for uplink traffic sent through RB #1 430 is sent through DL A/N #1 435 mapped with RB #1 430.

In FIG. 4, a user equipment uses a pair of a downlink carrier and an uplink carrier. A description is given of transmission resources of the uplink carrier that are used to transmit uplink HARQ feedback in response to downlink traffic received on the downlink carrier. A description is also given of transmission resources of the downlink carrier that are used to transmit downlink HARQ feedback in response to uplink traffic transmitted on the uplink carrier.

Figure 5:
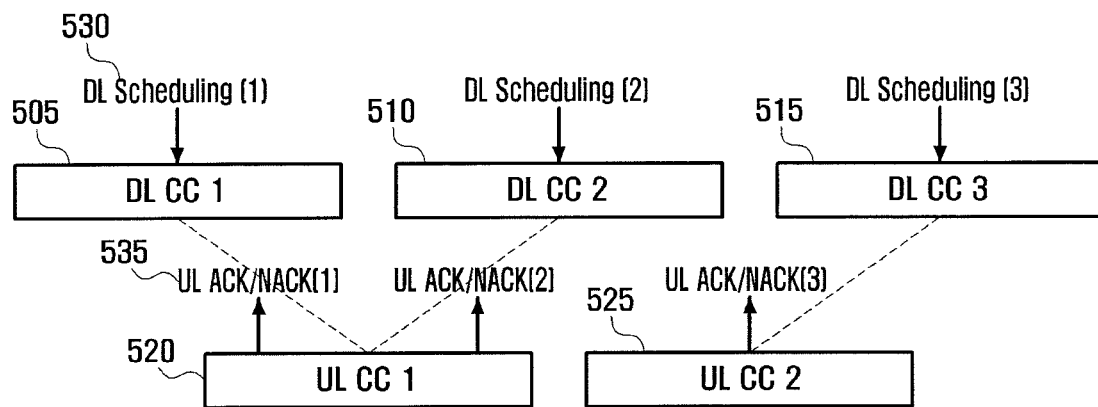
FIG. 5 illustrates an uplink HARQ feedback relationship between downlink carriers and uplink carriers in the LTE system.
Figure 6:
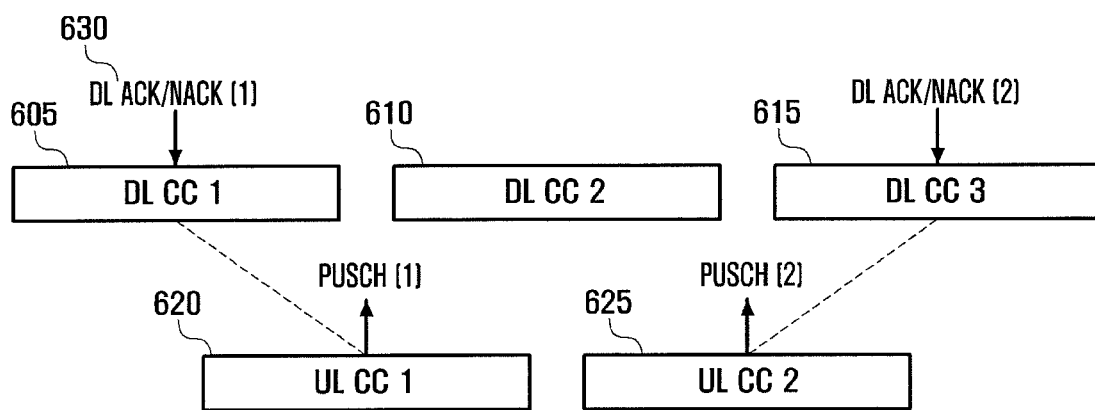
FIG. 6 illustrates a downlink HARQ feedback relationship between uplink carriers and downlink carriers in the LTE system.

In the case that multiple downlink carriers and multiple uplink carriers are configured for one user equipment supporting carrier aggregation, it is necessary to consider association between traffic and HARQ feedback. A possible solution is to notify the user equipment of a relationship between aggregated downlink and uplink carriers. FIGS. 5 and 6 illustrate HARQ feedback relationships in the LTE system employing multiple downlink and uplink carriers for carrier aggregation.

FIG. 5 illustrates an uplink HARQ feedback relationship between downlink carriers and uplink carriers in the LTE system. In FIG. 5, it is assumed that the user equipment uses three downlink carriers and two uplink carriers for carrier aggregation.

When carrier aggregation is utilized, relationships between downlink carriers and uplink carriers may be established in advance. In FIG. 5, it is configured in advance so that uplink HARQ feedback for downlink carrier 1 505 and downlink carrier 2 510 is transmitted through uplink carrier 1 520 and uplink HARQ feedback for downlink carrier 3 515 is transmitted through uplink carrier 2 525. Here, when uplink HARQ feedback for a downlink carrier x is sent through an uplink carrier y, the downlink carrier x and uplink carrier y are defined as having an uplink feedback relationship.

When downlink resource allocation information for the PDSCH of downlink carrier 1 505 is transmitted through the PDCCH of downlink carrier 1 505, HARQ feedback for the PDSCH of downlink carrier 1 505 is transmitted through uplink carrier 1 520 having an uplink feedback relationship.

Likewise, it is necessary to pre-specify a downlink carrier on which HARQ feedback for uplink traffic sent through the PUSCH of an uplink carrier is to be transmitted. FIG. 6 illustrates a downlink HARQ feedback relationship between uplink carriers and downlink carriers in the LTE system.

In FIG. 6, it is configured in advance so that downlink feedback for uplink carrier 1 620 is transmitted through downlink carrier 1 605 and downlink feedback for uplink carrier 2 625 is transmitted through downlink carrier 3 615. Here, when downlink HARQ feedback for an uplink carrier z is sent through a downlink carrier w, the uplink carrier z and downlink carrier w are defined as having a downlink feedback relationship.

Figure 7:
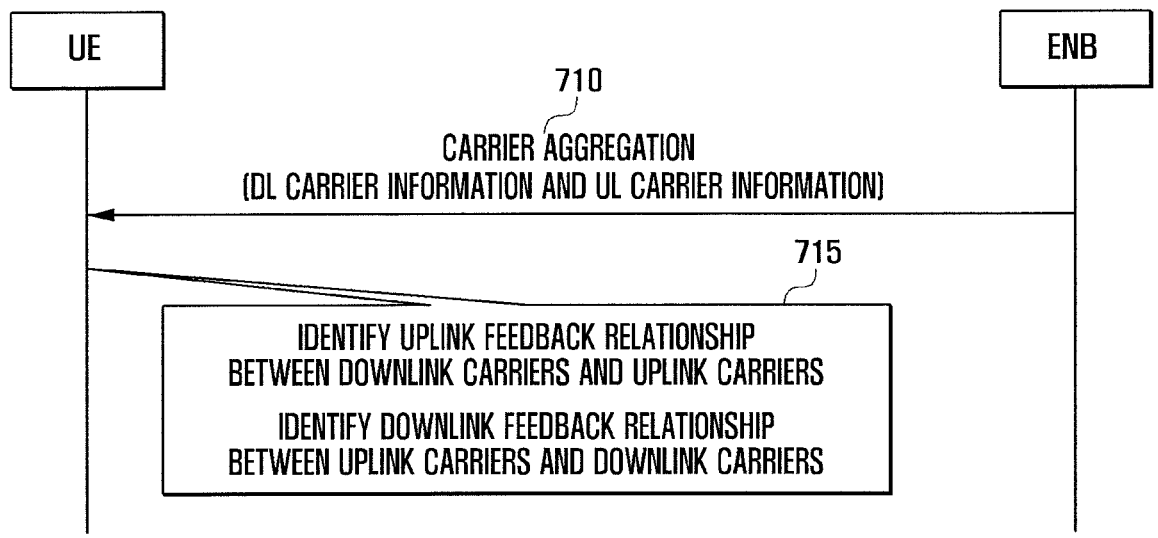
FIG. 7 is a sequence diagram for identifying uplink and downlink HARQ feedback relationships using a carrier aggregation message.

The uplink feedback relationship and downlink feedback relationship may be notified to each user equipment using a call setup message or the like. FIG. 7 is a sequence diagram for identifying uplink and downlink HARQ feedback relationships using a carrier aggregation message.

Referring to FIG. 7, the ENB sends a control message indicating carrier aggregation to the user equipment (710). Here, the control message may contain carrier aggregation information (regarding DL carriers and UL carriers) coded using information elements illustrated in Table 1. In Table 1, characters '>' and '>>' indicate levels of information, and an information element prefixed with '>>' is lower level information of an information element prefixed with '>'.

TABLE 1

| Information element name | Single/Multiple | Description |
| --- | --- | --- |
| >DL carrier information | Multiple (as many as the number of aggregated downlink carriers) | Information on aggregated downlink carriers |
| >>Carrier identifier | Single | Integer identifying carrier |
| >>Center frequency | Single | Center frequency of carrier |
| >>Bandwidth | Single | Bandwidth supported by carrier |
| >>UL feedback carrier identifier | Single | Identifier of UL carrier in uplink feedback relationship with DL carrier |
| >UL carrier information | Multiple (as many as the number of aggregated uplink carriers) | Information on aggregated uplink carriers |
| >>Carrier identifier | Single | Integer identifying carrier |
| >>Center frequency | Single | Center frequency of carrier |
| >>Bandwidth | Single | Bandwidth supported by carrier |
| >>DL feedback carrier identifier | Single | Identifier of DL carrier in downlink feedback relationship with UL carrier |

After reception of the carrier aggregation information coded using information elements illustrated in Table 1, the user equipment identifies an uplink feedback relationship between downlink carriers and uplink carriers (i.e., an uplink carrier to be used to send uplink HARQ feedback) and identifies a downlink feedback relationship between uplink carriers and downlink carriers (i.e., a downlink carrier to be used to receive downlink HARQ feedback) (715).

Even though feedback relationships are pre-established as described above, when the carrier transporting resource allocation information is different from the carrier transporting traffic, the pre-established feedback relationships are not sufficient for determining a carrier that is to be used for sending or receiving HARQ feedback. For example, when the downlink carrier delivering resource allocation information for downlink traffic is different from the downlink carrier delivering actual downlink traffic, it is necessary to determine an uplink carrier to deliver HARQ feedback.

Next, according to embodiments of the present invention, a description is given of a method for determining a carrier that is used to deliver downlink or uplink HARQ feedback in a user equipment supporting carrier aggregation.

First Embodiment

The first embodiment of the present invention provides a method for determining, when cross scheduling among downlink carriers is conducted, an uplink carrier supporting uplink HARQ feedback. In the method of the first embodiment, when the PDCCH of a first downlink carrier is used to carry downlink resource allocation information for a second downlink carrier, the uplink HARQ feedback is sent on an uplink carrier having an uplink feedback relationship with a downlink carrier on which PDSCH transmission is performed.

Figure 8:
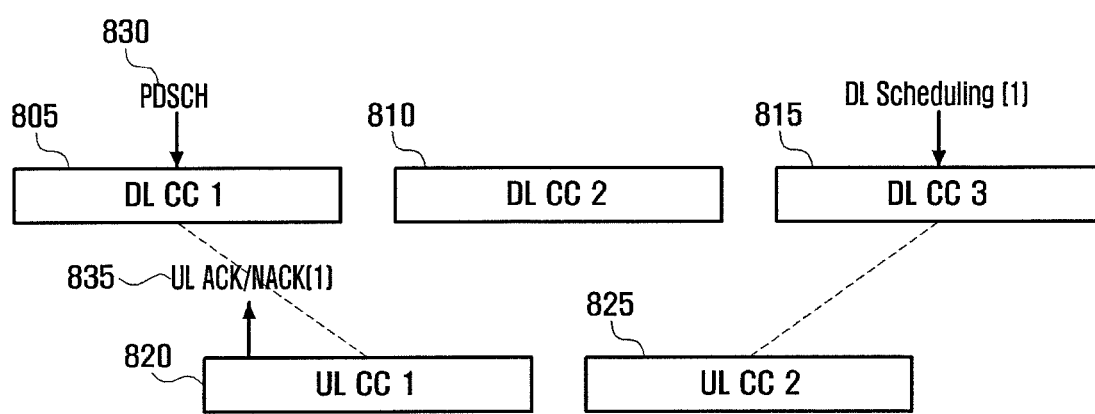
FIG. 8 illustrates provision of uplink HARQ feedback according to a first embodiment of the present invention.

FIG. 8 illustrates provision of uplink HARQ feedback according to the first embodiment of the present invention.

Referring to FIG. 8, when scheduling information for PDSCH 830 of downlink carrier 1 (DL CC1 805) is sent on downlink carrier 3 (DL CC3 815), the user equipment sends feedback (UL ACK/NACK (1) 835) through uplink carrier 1 (UL CC1 820) having an uplink feedback relationship with the downlink carrier on which PDSCH reception is performed.

In the first embodiment of FIG. 8, the base station should perform resource scheduling so that uplink feedback transmission resources are not duplicated. When the PDSCH of a downlink carrier is scheduled simultaneously by two downlink carriers using the same CCE, a problem that one or more feedbacks for PDSCH reception are transmitted through uplink feedback transmission resources of an uplink carrier having an uplink feedback relationship with the PDSCH may arise. For example, when RB #x of DL CC3 815 is allocated to a first user equipment by means of CCE #1 of DL CC1 805 and RB #y of DL CC3 815 is allocated to a second user equipment by means of CCE #1 of DL CC2 810, the different user equipments may use, to send different feedbacks, an uplink feedback transmission resource mapped with CCE #1 among uplink feedback transmission resources of UL CC2 825 having an uplink feedback relationship with DL CC3 815 delivering downlink traffic. Hence, when the method of the first embodiment is applied, the base station should perform resource scheduling so as to avoid such a feedback transmission resource conflict.

Figure 9:
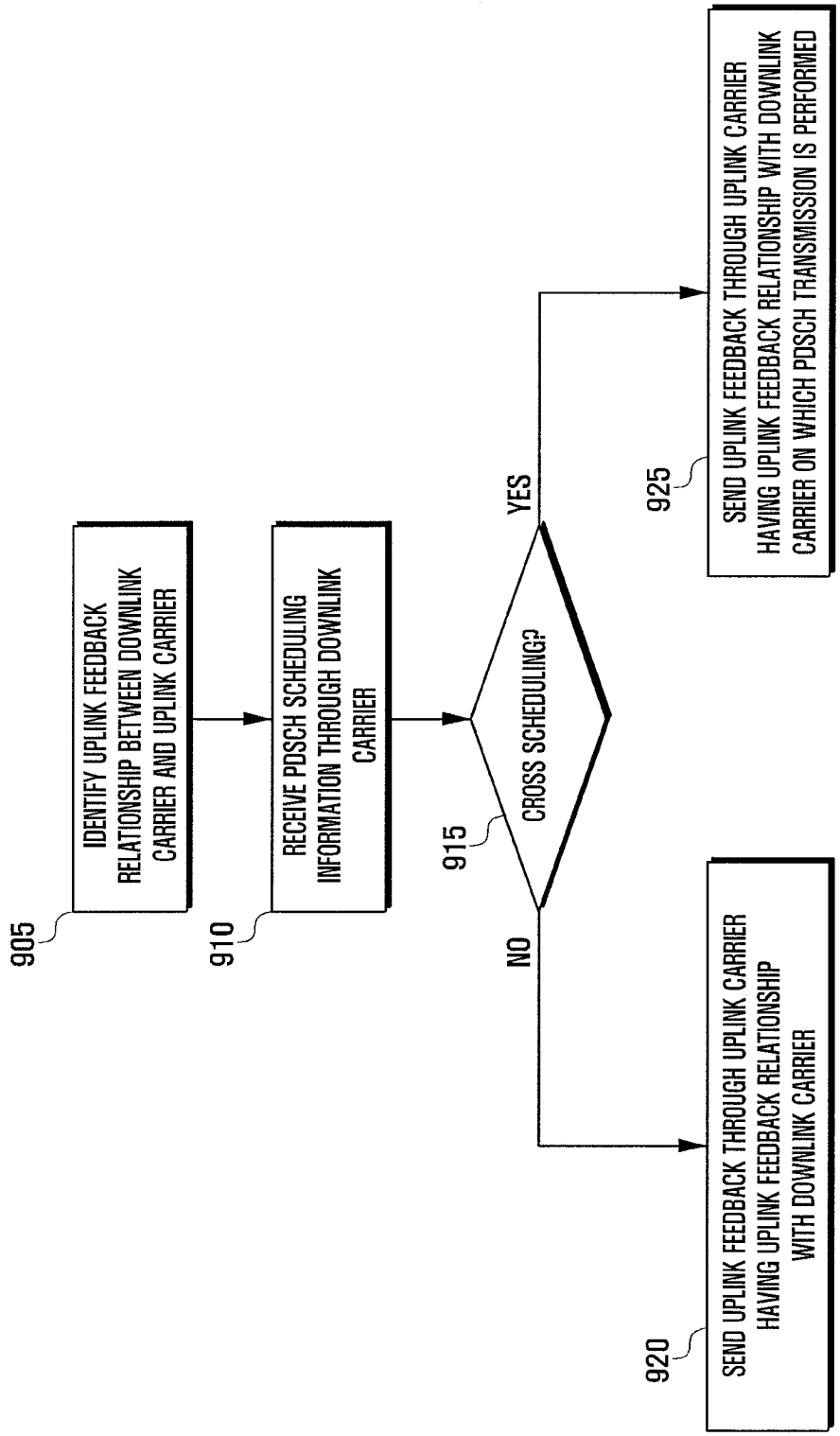
FIG. 9 is a flowchart illustrating UE operation according to the first embodiment of the present invention.

FIG. 9 is a flowchart illustrating UE operation for HARQ feedback according to the first embodiment of the present invention.

Referring to FIG. 9, the user equipment identifies an uplink feedback relationship between downlink carriers and uplink carriers on the basis of carrier aggregation information coded using information elements illustrated in Table 1 (905). Namely, the user equipment analyzes the received carrier aggregation information to determine an uplink carrier on which uplink feedback for a downlink carrier is to be sent. The user equipment receives PDSCH scheduling information (downlink resource allocation information) for a downlink carrier through the PDCCH of a downlink carrier (910), and proceeds to steps 915 to 925.

Upon reception of the downlink resource allocation information, the user equipment checks whether cross scheduling is used (915). That is, the user equipment determines whether the downlink carrier on which the downlink resource allocation information is received is the same as the downlink carrier on which downlink traffic is to be sent. When cross scheduling is not used (i.e., the two downlink carriers are the same), the user equipment sends uplink feedback through an uplink carrier having an uplink feedback relationship with the corresponding downlink carrier (920). When cross scheduling is used (i.e., the two downlink carriers are not the same), the user equipment sends uplink feedback through an uplink carrier having an uplink feedback relationship with the downlink carrier on which downlink traffic is received (925).

Second Embodiment

In the second embodiment of the present invention, when the PDCCH of a first downlink carrier is used to carry downlink resource allocation information for a second downlink carrier, the uplink HARQ feedback is sent on an uplink carrier having an uplink feedback relationship with a downlink carrier on which PDCCH reception is performed.

Figure 10:
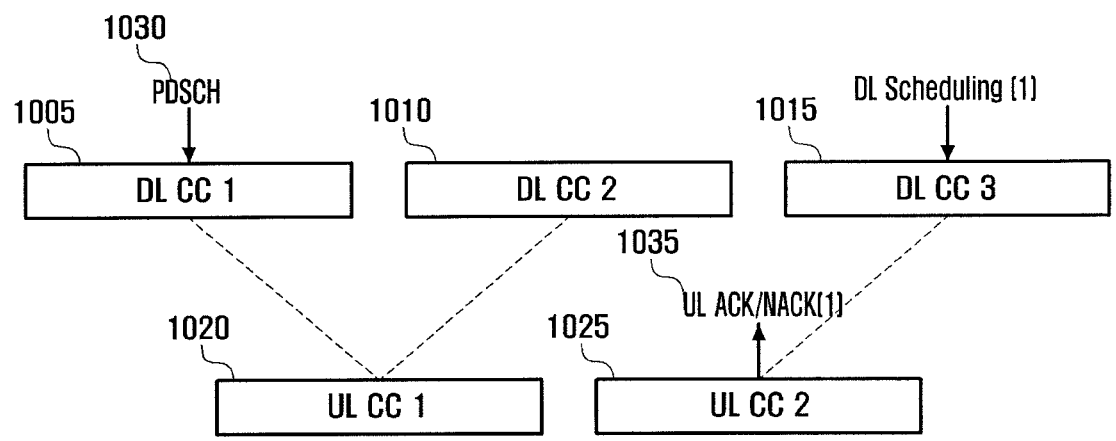
FIG. 10 illustrates provision of uplink HARQ feedback according to a second embodiment of the present invention.

FIG. 10 illustrates provision of uplink HARQ feedback according to the second embodiment of the present invention.

Referring to FIG. 10, when scheduling information for PDSCH 1030 of downlink carrier 1 (DL CC1 1005) is sent on downlink carrier 3 (DL CC3 1015), the user equipment sends feedback through uplink carrier 2 (UL CC2 10250) having an uplink feedback relationship with the downlink carrier on which resource allocation information is received. In the second embodiment, resource conflicts for uplink feedback transmission described in relation to the first embodiment do not occur. As described before, the uplink feedback transmission resource for downlink traffic is mapped with the CCE through which resource allocation information for the downlink traffic is transmitted. Hence, resource conflicts for uplink feedback transmission do not arise unless resource allocation information is allocated to different user equipments through the same CCE.

Figure 11:
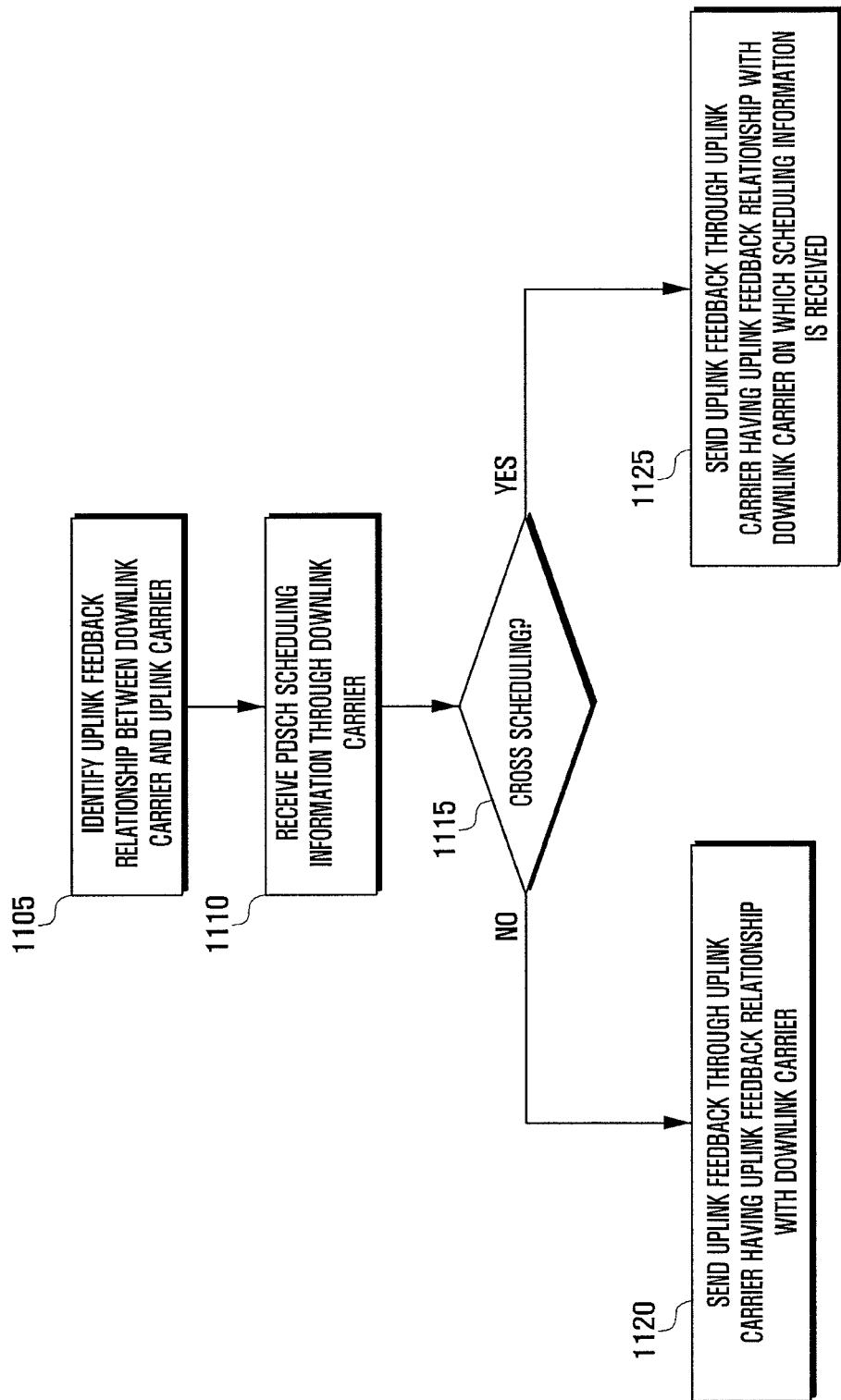
FIG. 11 is a flowchart illustrating UE operation according to the second embodiment of the present invention.

FIG. 11 is a flowchart illustrating UE operation according to the second embodiment of the present invention.

Referring to FIG. 11, the user equipment identifies an uplink feedback relationship between downlink carriers and uplink carriers on the basis of carrier aggregation information coded using information elements illustrated in Table 1 (1105). Namely, the user equipment determines an uplink carrier on which uplink feedback for a downlink carrier is to be sent. The user equipment receives PDSCH scheduling information (downlink resource allocation information) for a downlink carrier through the PDCCH of a downlink carrier (1110), and proceeds to steps 1115 to 1125.

Upon reception of the downlink resource allocation information through the PDCCH of a downlink carrier, the user equipment checks whether cross scheduling is used (1115). That is, the user equipment determines whether the downlink carrier on which the downlink resource allocation information is received is the same as the downlink carrier on which downlink traffic is received. When cross scheduling is not used (i.e., the two downlink carriers are the same), the user equipment sends uplink feedback through an uplink carrier having an uplink feedback relationship with the corresponding downlink carrier (1120). When cross scheduling is used (i.e., the two downlink carriers are not the same), the user equipment sends uplink feedback through an uplink carrier having an uplink feedback relationship with the downlink carrier on which the downlink resource allocation information is received (1125).

Third Embodiment

The third embodiment of the present invention relates to a method for determining, when cross scheduling among uplink carriers is conducted, a downlink carrier supporting downlink HARQ feedback. In the third embodiment, to receive downlink HARQ feedback in response to PUSCH transmission, when PUSCH transmission is performed according to regular scheduling, the user equipment receives downlink HARQ feedback on a downlink carrier having a feedback relationship with an uplink carrier on which the PUSCH transmission is performed. When PUSCH transmission is performed according to cross carrier scheduling, the user equipment receives downlink HARQ feedback on a downlink carrier through which downlink resource allocation information is received.

Figure 12:
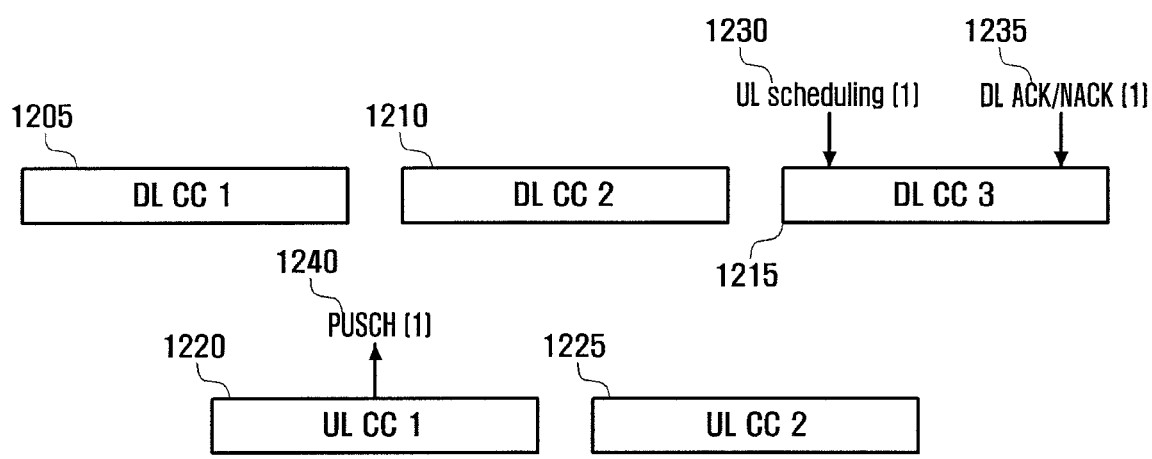
FIG. 12 illustrates provision of downlink HARQ feedback according to a third embodiment of the present invention.

FIG. 12 illustrates provision of downlink HARQ feedback according to the third embodiment of the present invention.

Referring to FIG. 12, in the third embodiment of the present invention, when the PDCCH of a downlink carrier is used to carry uplink resource allocation information for an uplink carrier, the downlink HARQ feedback is sent on the downlink carrier on which the uplink resource allocation information is sent. For example, when resource allocation information (UL scheduling (1) 1230) for the PUSCH of uplink carrier 1 (UL CC1 1220) is sent on downlink carrier 3 (DL CC3 1215), downlink feedback (DL ACK/NACK (1) 1235) for PUSCH transmission 1240 through uplink carrier 1 (UL CC1 1220) is received on downlink carrier 3 (DL CC3 1215) on which the resource allocation information is sent.

In the case of utilizing the method of the third embodiment, as the downlink carrier used to send resource allocation information for the PUSCH is also used to support downlink HARQ feedback, it is not necessary to establish a separate downlink feedback relationship, simplifying UE operation. In contrast, the base station should perform uplink transmission resource allocation so as not to cause resource conflicts for downlink feedback transmission. For example, when RB #1 of UL CC1 is scheduled by DL CC3, feedback is transmitted using a downlink feedback transmission resource corresponding to RB #1 of DL CC3. Here, if RB #1 of another uplink carrier is also scheduled by DL CC3, a problem that the downlink feedback transmission resource is used to carry feedbacks for two different uplink transmissions is caused. The base station should perform scheduling so as not to cause such a problem.

Figure 13A:
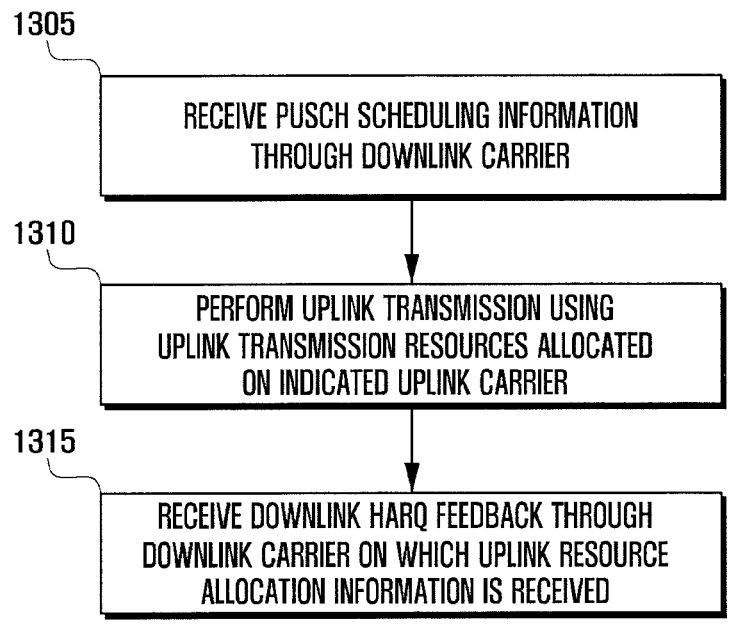
FIGS. 13A and 13B illustrates UE operation according to the third embodiment of the present invention.
Figure 13B:
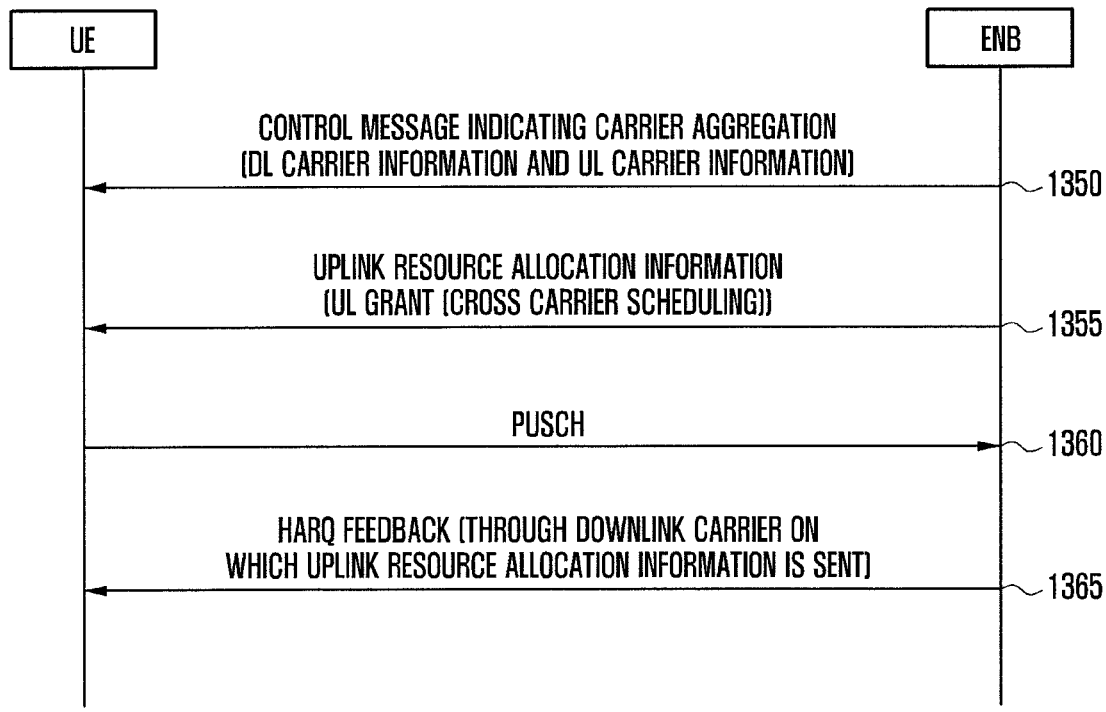

FIG. 13A is a flowchart for UE operation according to the third embodiment of the present invention, and FIG. 13B is a sequence diagram for an HARQ handling procedure between the user equipment and base station according thereto.

Referring to FIG. 13B, the ENB sends a control message indicating carrier aggregation to the user equipment (1350). Here, the control message contains carrier aggregation information related to downlink carriers and uplink carriers aggregated in the user equipment (DL carrier information and UL carrier information). The carrier aggregation information may include information on unique identifiers, center frequencies and bandwidths of downlink carriers and uplink carriers, and feedback relationships between downlink carriers and uplink carriers. After reception of the control message, the user equipment performs downlink and uplink carrier configuration and monitors the PDCCH of each downlink carrier to receive downlink or uplink scheduling information.

The ENB sends uplink resource allocation information (UL grant (cross carrier scheduling)) for an uplink carrier through a downlink carrier (1355). After reception of the uplink resource allocation information, the user equipment performs PUSCH transmission using allocated uplink transmission resources on the uplink carrier (1360). To receive downlink HARQ feedback in response to the PUSCH transmission, the user equipment monitors the downlink feedback channel of the downlink carrier on which the uplink resource allocation information for the PUSCH transmission is received. After reception of PUSCH data from the user equipment, the ENB sends downlink HARQ feedback through the downlink carrier on which the uplink resource allocation information has been sent (1365). That is, the user equipment may perform PUSCH transmission using uplink transmission resources allocated by the base station, and monitor the downlink carrier on which uplink resource allocation information is received to receive downlink HARQ feedback.

In the third embodiment, when carrier aggregation is employed, HARQ feedback relationships between downlink carriers and uplink carriers may be configured. Here, an HARQ feedback relationship may be indicated by a common identifier assigned to paired downlink and uplink carriers. For example, for PUSCH transmission through an uplink carrier with an identifier 'x', downlink HARQ feedback may be received through a downlink carrier with an identifier 'x'. Alternatively, downlink carrier information may directly indicate an association between a downlink carrier and an uplink carrier. An HARQ feedback relationship is not valid when uplink transmission resources are allocated through cross carrier scheduling. Hence, when uplink transmission resources are allocated through cross carrier scheduling, the user equipment receives HARQ feedback through a downlink carrier that is used to transmit uplink resource allocation information not through a downlink carrier associated with the uplink carrier.

In the third embodiment of the present invention, there are two approaches to handle downlink HARQ feedback for PUSCH transmission. In one approach, when PUSCH transmission is conducted according to regular scheduling, the base station sends downlink HARQ feedback through a downlink carrier having a feedback relationship with an uplink carrier on which PUSCH transmission is conducted and the user equipment receives the downlink HARQ feedback. In the other approach, when PUSCH transmission is conducted according to cross carrier scheduling, the base station sends downlink HARQ feedback through a downlink carrier on which resource allocation information is sent and the user equipment receives the downlink HARQ feedback.

FIG. 13A illustrates a procedure in which the base station sends downlink HARQ feedback through a downlink carrier on which resource allocation information is sent and the user equipment receives the downlink HARQ feedback. Referring to FIG. 13A, when the ENB sends uplink resource allocation information (UL grant (cross carrier scheduling)) for an uplink carrier through the PDCCH of a downlink carrier, the user equipment receives the uplink resource allocation information (PUSCH scheduling information) (1305). The user equipment may be aware that HARQ feedback will be transmitted on a downlink carrier on which PUSCH scheduling information is received. The user equipment performs PUSCH transmission using uplink transmission resources allocated on the indicated uplink carrier (1310). After reception of the PUSCH data, the ENB sends downlink HARQ feedback through the downlink carrier on which the uplink resource allocation information is sent. After PUSCH transmission, the user equipment monitors the downlink carrier on which the uplink resource allocation information is received to receive the HARQ feedback for the PUSCH data.

Fourth Embodiment

The fourth embodiment of the present invention relates to a method for determining, when cross scheduling among uplink carriers is conducted, a downlink carrier supporting downlink HARQ feedback.

Figure 14:
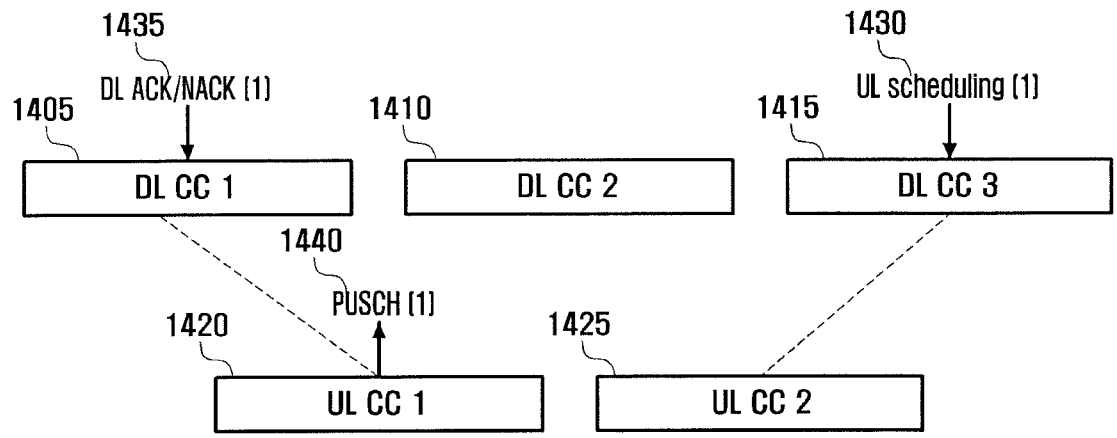
FIG. 14 illustrates provision of downlink HARQ feedback according to a fourth embodiment of the present invention.

FIG. 14 illustrates provision of downlink HARQ feedback according to the fourth embodiment of the present invention.

Referring to FIG. 14, when the PDCCH of a downlink carrier is used to carry uplink resource allocation information for an uplink carrier, the downlink HARQ feedback is sent on a downlink carrier having a downlink feedback relationship with an uplink carrier on which uplink traffic is sent. For example, when resource allocation information (UL scheduling 1430) for the PUSCH of uplink carrier 1 (UL CC1 1420) is sent through downlink carrier 3 (DL CC3 1415), downlink feedback (DL ACK/NACK (1) 1435) for PUSCH 1440 through uplink carrier 1 (UL CC1 1420) is sent through downlink carrier 1 1405 having a downlink feedback relationship with uplink carrier 1 (UL CC1 1420).

When the method of the fourth embodiment is utilized, it is necessary to establish a downlink feedback relationship between a downlink carrier and uplink carrier, but resource conflicts for downlink feedback transmission described in relation to the third embodiment do not occur. For example, when RB #1 of UL CC1 is scheduled by DL CC3, feedback is transmitted using a downlink feedback transmission resource corresponding to RB #1 of DL CC1. As the downlink feedback transmission resource is reserved for RB #1 of DL CC1, resource conflicts for downlink feedback transmission do not occur unless the scheduler erroneously assigns RB #1 of DL CC1 to another user equipment.

Figure 15:
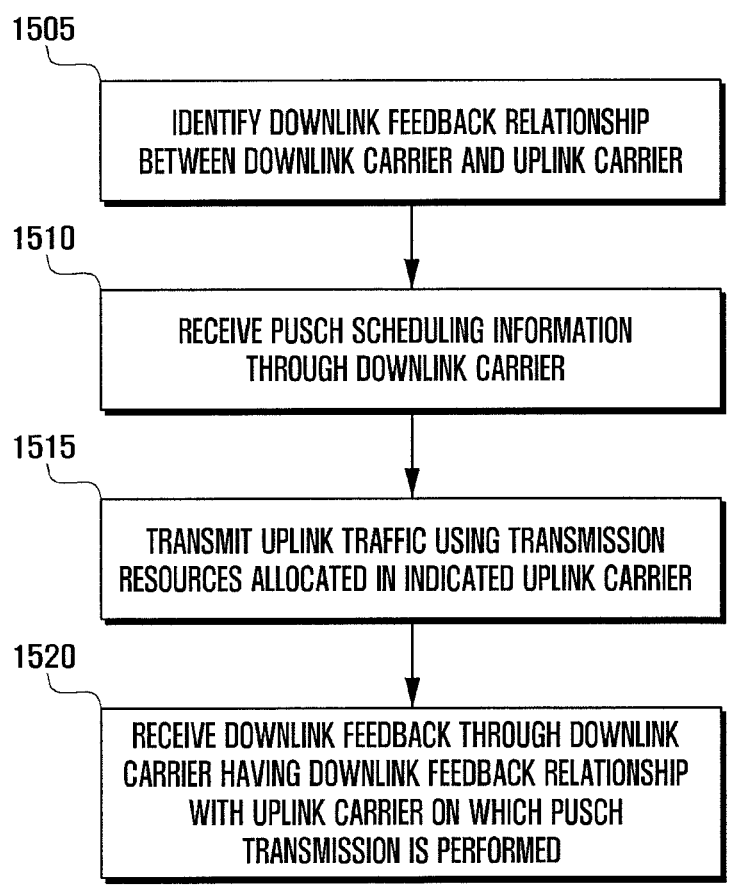
FIG. 15 is a flowchart illustrating UE operation according to the fourth embodiment of the present invention.

FIG. 15 is a flowchart illustrating UE operation according to the fourth embodiment of the present invention.

Referring to FIG. 15, the user equipment identifies a downlink feedback relationship between downlink carriers and uplink carriers on the basis of carrier aggregation information coded using information elements illustrated in Table 1 (1505). Namely, the user equipment determines a downlink carrier on which downlink feedback for an uplink carrier is to be received.

When the ENB sends uplink resource allocation information for an uplink carrier through the PDCCH of a downlink carrier, the user equipment receives the uplink resource allocation information through the downlink carrier (1510). The user equipment transmits uplink traffic on the indicated uplink carrier (1515). The user equipment receives HARQ feedback for the uplink traffic through a downlink HARQ feedback transmission resource of a downlink carrier having a downlink feedback relationship with the uplink carrier on which the uplink traffic is sent (1520).

In the LTE mobile communication system, as transmission resources are dynamically allocated for packet transmission, one or more pieces of resource allocation information may be needed to transmit one packet. As dynamic resource allocation is inefficient for applications such as VoIP repeatedly generating small packets, the LTE mobile communication system also provides a data transmission scheme based on semi-persistent transmission resources. In semi-persistent scheduling (SPS), once activated, the same transmission resources are repeatedly allocated to the same user equipment at regular intervals without separate resource allocation information. Under semi-persistent scheduling, as allocated transmission resources are valid for a long time, separate resource allocation information is not necessary. To allocate semi-persistent transmission resources, the base station sends a semi-persistent resource allocation message through the PDCCH to a user equipment and sends packets to the user equipment using allocated semi-persistent transmission resources.

Next, a description is given of handling HARQ feedback using semi-persistent transmission resources according to the fifth to seventh embodiments of the present invention.

Fifth Embodiment

In the case of downlink semi-persistent transmission resources, after the ENB sends a control signal indicting semi-persistent resource activation through the PDCCH to the user equipment, PDSCH transmission is conducted at regular intervals through the activated semi-persistent transmission resources without downlink resource allocation information. The fifth embodiment of the present invention provides a method wherein when PDSCH transmission is performed through semi-persistent transmission resources without PDCCH operation, the user equipment sends HARQ feedback through an uplink carrier having an uplink feedback relationship with a downlink carrier on which PDSCH transmission is performed.

FIG. 16 is a flowchart illustrating UE operation according to the fifth embodiment of the present invention.

Referring to FIG. 16, the user equipment identifies an uplink feedback relationship between downlink carriers and uplink carriers (1605). When the user equipment receives downlink traffic (i.e., PDSCH reception) on a downlink carrier (1610), it checks whether the PDSCH reception is performed through semi-persistent transmission resources (1615). Here, PDSCH reception through semi-persistent transmission resources indicates absence of PDCCH reception. When the PDSCH reception is performed through semi-persistent transmission resources, the user equipment sends uplink feedback through an uplink carrier having an uplink feedback relationship with the downlink carrier on which the PDSCH reception is performed (1620). When the PDSCH reception is performed through regular dynamic transmission resources (not through semi-persistent transmission resources), the user equipment sends uplink feedback through an uplink carrier having an uplink feedback relationship with a downlink carrier on which PDCCH reception is performed (1625).

As described above, in the fifth embodiment, when PDSCH reception is performed through semi-persistent transmission resources without PDCCH operation, the user equipment sends uplink feedback through an uplink carrier having an uplink feedback relationship with a downlink carrier on which the PDSCH reception is performed. Otherwise, the user equipment sends uplink feedback through an uplink carrier having an uplink feedback relationship with a downlink carrier on which scheduling information is received.

Sixth Embodiment

The sixth embodiment of the present invention relates to a method for determining, when PUSCH transmission is performed through semi-persistent uplink transmission resources, a downlink carrier supporting downlink HARQ feedback. PUSCH transmission through semi-persistent uplink transmission resources indicates absence of uplink resource allocation information. In the sixth embodiment, when PUSCH transmission is performed through semi-persistent transmission resources, the user equipment receives downlink HARQ feedback through the PDCCH of a downlink carrier preset at the time of configuring semi-persistent transmission resources.

Figure 17A:
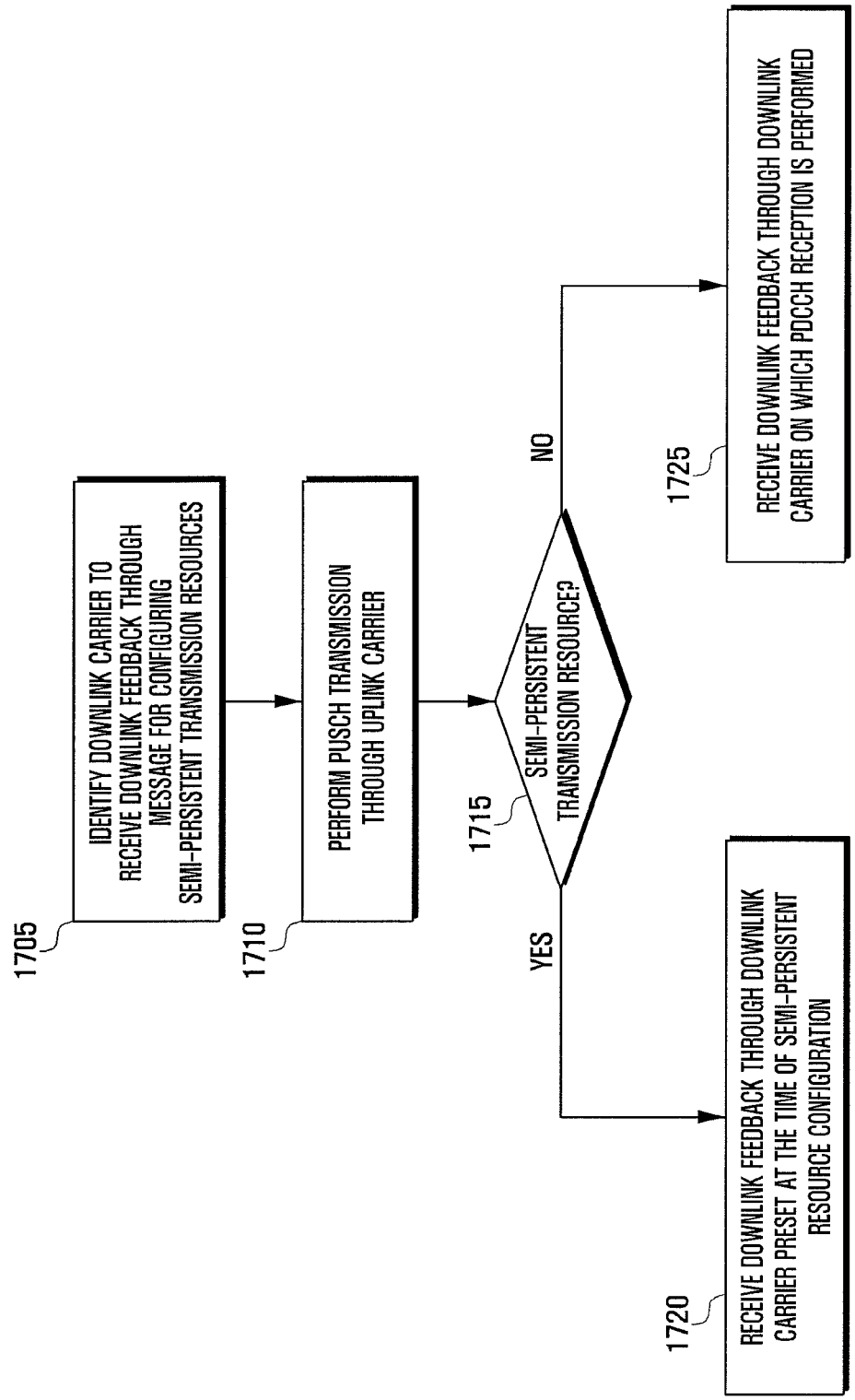
FIGS. 17A and 17B illustrates UE operation according to a sixth embodiment of the present invention.
Figure 17B:
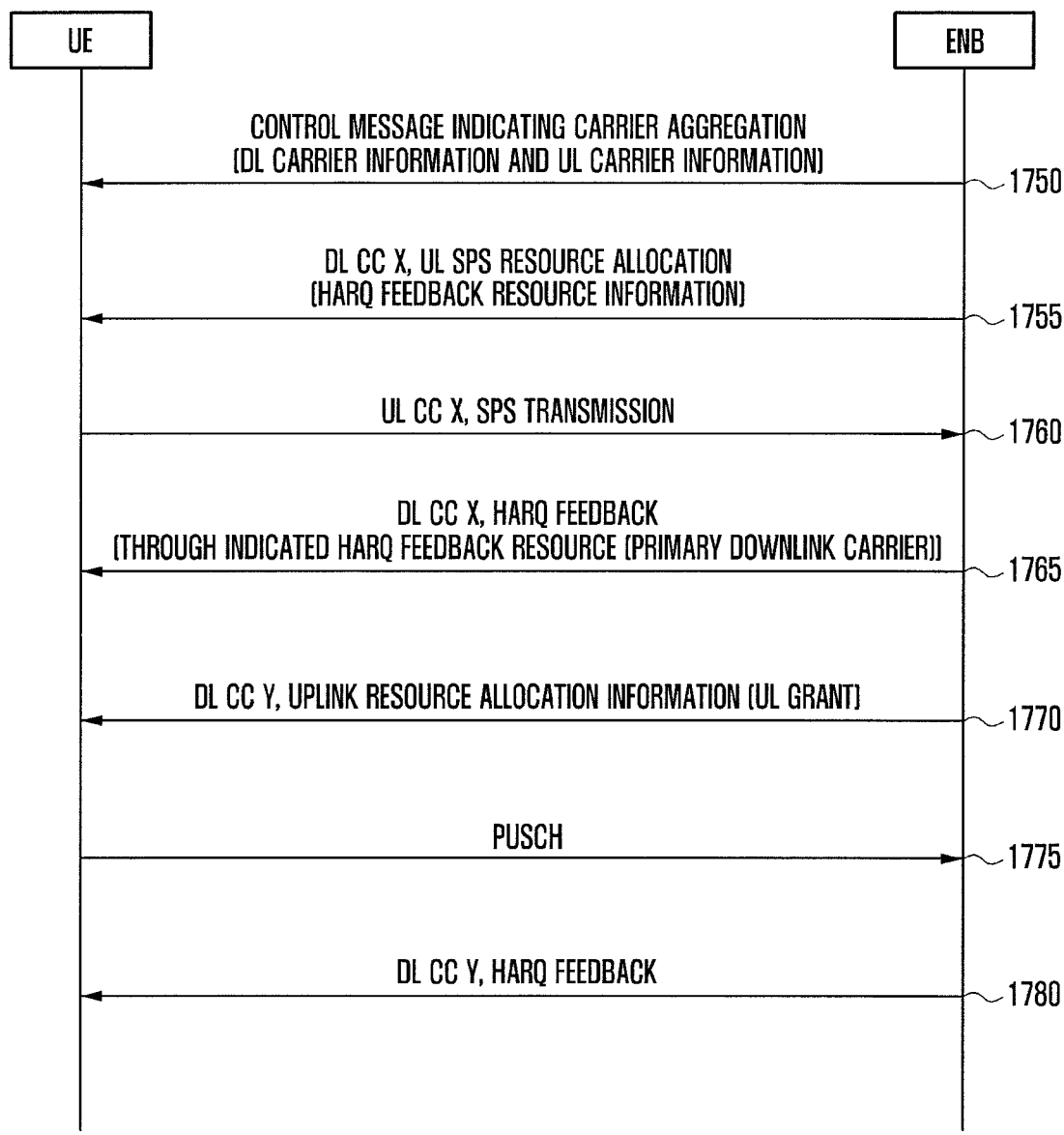

FIG. 17A is a flowchart for UE operation according to the sixth embodiment of the present invention, and FIG. 17B is a sequence diagram for an HARQ handling procedure between the user equipment and base station according thereto.

Referring to FIG. 17B, the ENB sends a control message indicating carrier aggregation to the user equipment (1750). Here, the control message contains carrier aggregation information related to downlink carriers and uplink carriers aggregated in the user equipment (DL carrier information and UL carrier information). The carrier aggregation information may include information on unique identifiers, center frequencies and bandwidths of downlink carriers and uplink carriers, and feedback relationships between downlink carriers and uplink carriers. After reception of the control message, the user equipment performs downlink and uplink carrier configuration and monitors the PDCCH of each downlink carrier to receive downlink or uplink scheduling information.

The ENB sends uplink semi-persistent resource allocation information through a downlink carrier to the user equipment (1755). Here, the uplink semi-persistent resource allocation information may contain information specifying transmission resources to be used for downlink feedback (for example, information indicating transmission resources of the PDCCH to be used for delivering downlink feedback in response to uplink traffic through the uplink semi-persistent transmission resources: DL CC x; UL SPS resource allocation (HARQ feedback resource information). Here, only transmission resources are indicated, and the downlink carrier to deliver downlink feedback is not indicated.

After uplink semi-persistent resources are allocated by the ENB, the user equipment performs uplink transmission at regular intervals through the allocated uplink semi-persistent resources (UL CC x: SPS transmission) (1760). For example, after a given time from reception of the uplink semi-persistent resource allocation information, the user equipment may perform uplink transmission through the uplink semi-persistent resources. After uplink transmission, the user equipment receives downlink HARQ feedback through a transmission resource of the PDCCH of a downlink carrier identified according to a preset rule (1765). The downlink carrier delivering downlink HARQ feedback in response to uplink traffic transmitted through semi-persistent transmission resources may be the primary carrier or a downlink carrier associated with an uplink carrier supporting the allocated uplink semi-persistent transmission resources.

For uplink transmission using dynamically allocated transmission resources (not semi-persistent transmission resources), the user equipment receives downlink HARQ feedback on a downlink carrier on which uplink resource allocation information is received. More specifically, the ENB sends uplink resource allocation information for an uplink carrier through a downlink carrier (DL CC y: UL grant) (1770), and the user equipment receives the uplink resource allocation information. The user equipment performs uplink transmission using uplink transmission resources of the uplink carrier (1775). The ENB sends downlink HARQ feedback for PUSCH data through the downlink carrier on which the uplink resource allocation information has been sent (1780). After PUSCH transmission, the user equipment monitors the downlink carrier on which the uplink resource allocation information is received to receive downlink HARQ feedback. Here, the dynamically allocated transmission resources refer to transmission resources allocated according to regular scheduling (not semi-persistent scheduling). The primary carrier is also referred to as the primary cell.

Referring to FIG. 17A, which illustrates UE operation according to the sixth embodiment of the present invention, the user equipment identifies a downlink carrier that is used to receive downlink feedback in response to uplink transmission using semi-persistent transmission resources during configuration of semi-persistent transmission resources (1705). Semi-persistent transmission resources are configured according to a given RRC message. The ENB may send the user equipment an RRC message containing information on the period of semi-persistent transmission resource allocation and on the downlink carrier to deliver downlink feedback for uplink transmission using semi-persistent transmission resources. Instead of a message for semi-persistent resource configuration, a specific downlink carrier may be pre-scheduled to deliver downlink HARQ feedback for uplink transmission using semi-persistent transmission resources. The anchor downlink carrier (primary carrier or special carrier), which is always active, may be pre-scheduled to deliver such downlink HARQ feedback. Among multiple downlink carriers, the anchor downlink carrier (primary carrier) is attached to the user equipment at all times and is always active. One user equipment may maintain a single anchor carrier.

The user equipment performs PUSCH transmission through an uplink carrier (1710). The user equipment checks whether the PUSCH transmission is performed using semi-persistent transmission resources (1715). Here, uplink transmission using semi-persistent transmission resources indicates absence of an associated PDCCH. In this case, the base station sends downlink HARQ feedback for the PUSCH transmission through a downlink carrier preset at the time of semi-persistent resource configuration. Hence, when the PUSCH transmission is performed using semi-persistent transmission resources, the user equipment receives downlink HARQ feedback for the PUSCH transmission through a downlink carrier preset at the time of semi-persistent resource configuration (anchor carrier or primary carrier) (1720). When the PUSCH transmission is performed without using semi-persistent transmission resources (a PDCCH directs uplink transmission), the user equipment receives downlink HARQ feedback through a downlink carrier on which PDCCH reception for uplink transmission is performed (1725).

As described above, in the sixth embodiment, when the user equipment performs PUSCH transmission using semi-persistent transmission resources (without using uplink resource allocation information), it receives downlink HARQ feedback for the PUSCH transmission through a downlink carrier preset at the time of semi-persistent resource configuration. When the user equipment performs PUSCH transmission without using semi-persistent transmission resources, it receives downlink HARQ feedback through a downlink carrier on which PDCCH reception for uplink transmission is performed.

Seventh Embodiment

The seventh embodiment of the present invention provides a method wherein, when PUSCH transmission is performed using semi-persistent transmission resources, HARQ feedback is received on a downlink carrier associated in path loss with the uplink carrier in which the semi-persistent transmission resources are configured. Here, for uplink transmission, the user equipment adjusts transmit power output in consideration of path loss of a given downlink carrier.

Figure 18A:
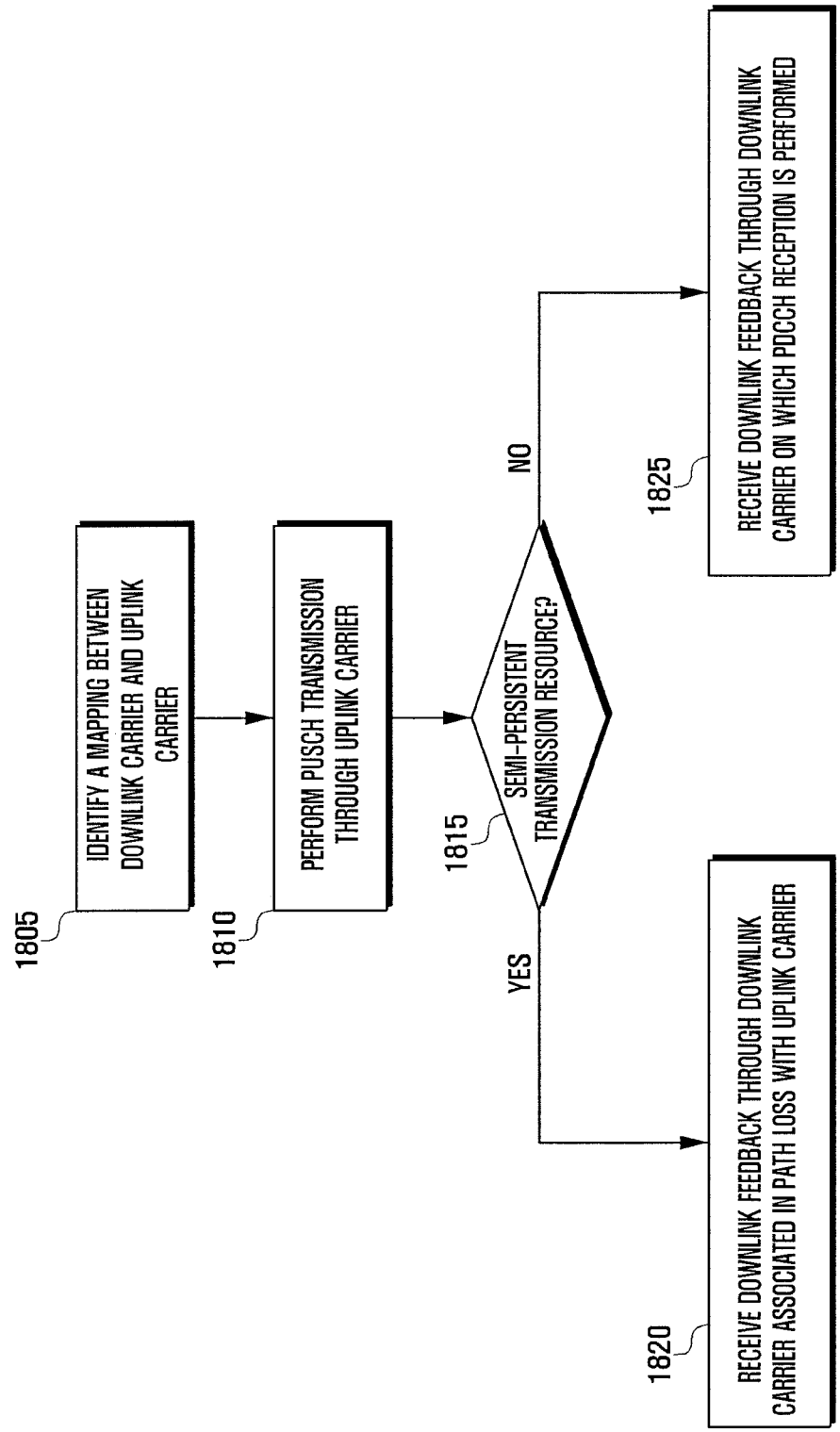
FIGS. 18A and 18B illustrates UE operation according to a seventh embodiment of the present invention.
Figure 18B:
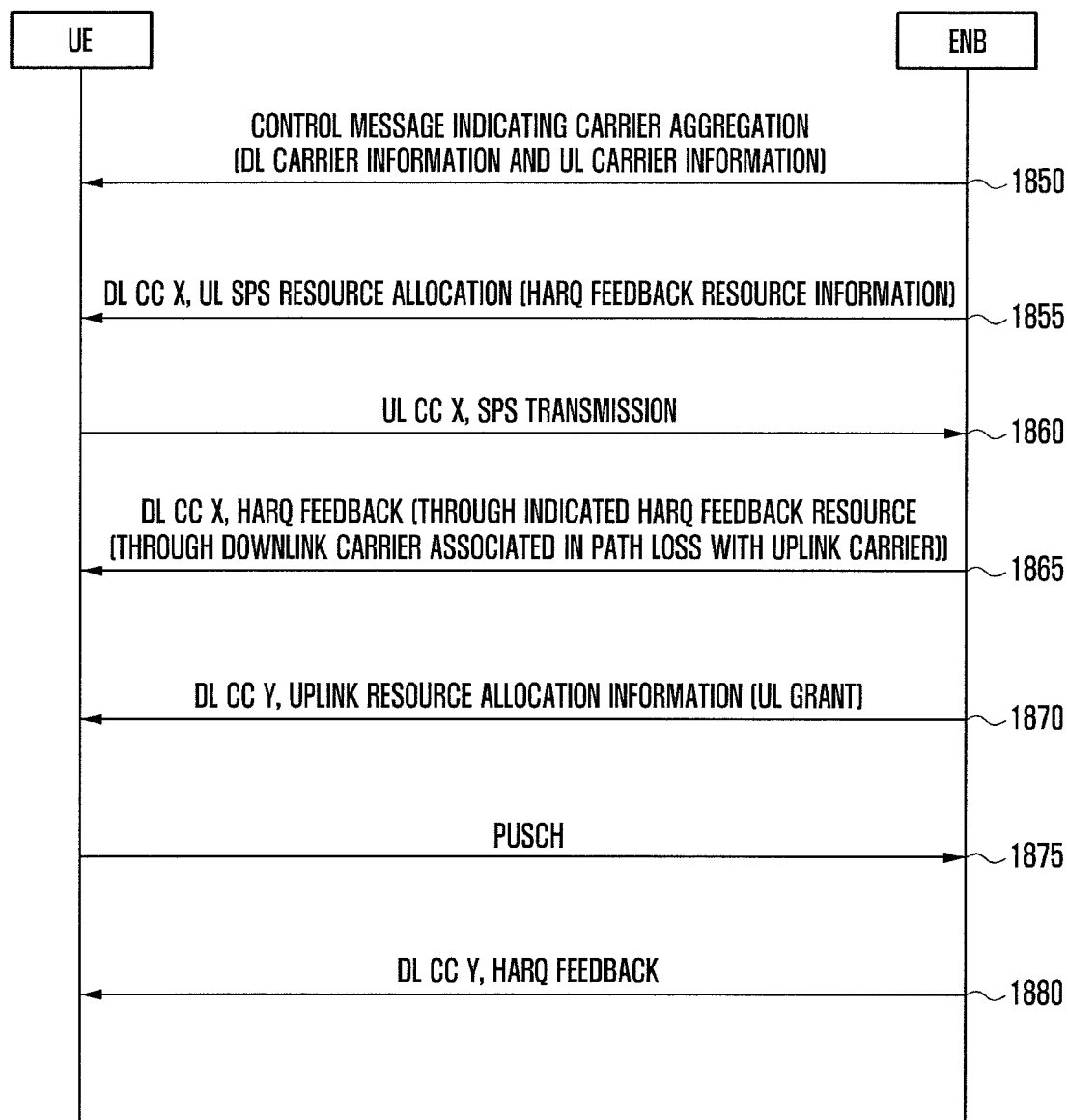

FIG. 18A is a flowchart for UE operation according to the seventh embodiment of the present invention, and FIG. 18B is a sequence diagram for an HARQ handling procedure between the user equipment and base station according thereto.

Referring to FIG. 18B, the ENB sends a control message indicating carrier aggregation to the user equipment (1850). Here, the control message contains carrier aggregation information related to downlink carriers and uplink carriers aggregated in the user equipment (DL carrier information and UL carrier information). The carrier aggregation information may include information on unique identifiers, center frequencies and bandwidths of downlink carriers and uplink carriers, and feedback relationships between downlink carriers and uplink carriers. After reception of the control message, the user equipment performs downlink and uplink carrier configuration and monitors the PDCCH of each downlink carrier to receive downlink or uplink scheduling information.

The ENB sends uplink semi-persistent resource allocation information through a downlink carrier (DL CC x; UL SPS resource allocation) to the user equipment, and the user equipment receives the same (1855). Here, the uplink semi-persistent resource allocation information may contain information specifying transmission resources to be used for downlink feedback (for example, information indicating transmission resources of the PDCCH to be used for delivering downlink feedback in response to uplink traffic through the uplink semi-persistent transmission resources: HARQ feedback resource information). Here, only transmission resources are indicated, and the downlink carrier to deliver downlink feedback is not indicated.

The downlink carrier to deliver downlink HARQ feedback in response to uplink traffic using uplink semi-persistent transmission resources may be determined according to a preset criterion. For example, downlink HARQ feedback may be received on a downlink carrier associated in path loss with the uplink carrier in which the uplink semi-persistent transmission resources are configured. A path loss association between a downlink carrier and an uplink carrier may be determined by the gap between the center frequency of the downlink carrier and that of the uplink carrier. For example, when a downlink carrier and an uplink carrier are separated less than a given bandwidth, they may be regarded as being associated in path loss. Alternatively, the control message indicating carrier aggregation may contain an indication to downlink and uplink carriers associated in path loss.

After uplink semi-persistent resources are allocated, the user equipment performs uplink transmission at regular intervals through the allocated uplink semi-persistent resources (1860). For example, after a given time from reception of the uplink semi-persistent resource allocation information, the user equipment may perform uplink transmission through the uplink semi-persistent resources. After uplink transmission, the user equipment receives downlink HARQ feedback through a transmission resource (indicated at step 1855) of the PDCCH of a downlink carrier identified according to a preset rule (1865).

For uplink transmission using dynamically allocated transmission resources (not semi-persistent transmission resources), the ENB sends downlink HARQ feedback on a downlink carrier on which uplink resource allocation information is sent, and the user equipment receives the same. More specifically, the user equipment receives uplink resource allocation information for an uplink carrier through a downlink carrier (1870). The user equipment performs uplink transmission using uplink transmission resources of the uplink carrier (1875). The user equipment receives downlink HARQ feedback for uplink data through the downlink carrier on which the uplink resource allocation information has been received (1880). That is, upon reception of PUSCH data, the ENB sends downlink feedback for the PUSCH data through the downlink carrier on which the uplink resource allocation information has been sent. After PUSCH transmission using allocated uplink transmission resources, the user equipment monitors the downlink carrier on which the uplink resource allocation information is received to receive downlink feedback.

Referring to FIG. 18A, which illustrates UE operation according to the seventh embodiment, after sending a control message indicating carrier aggregation (DL carrier information and UL carrier information), the ENB sends uplink semi-persistent resource allocation information through a downlink carrier (UL SPS resource allocation (HARQ feedback resource information)) to the user equipment. In the seventh embodiment, downlink HARQ feedback may be received on a downlink carrier associated in path loss with the uplink carrier in which the uplink semi-persistent transmission resources are configured. The user equipment identifies a path loss association between downlink carries and uplink carriers (1805). Here, the user equipment identifies mappings between downlink carries and uplink carriers, and information on the mappings may be provided to the user equipment using an RRC control message during a call setup procedure.

The user equipment performs PUSCH transmission through an uplink carrier (1810). The user equipment checks whether the PUSCH transmission is performed using semi-persistent transmission resources (1815). Here, uplink transmission using semi-persistent transmission resources indicates absence of an associated PDCCH. When the PUSCH transmission is performed using semi-persistent transmission resources, the user equipment receives downlink HARQ feedback for the PUSCH transmission through a downlink carrier associated in path loss with the uplink carrier on which the PUSCH transmission is performed using the semi-persistent transmission resources (1820). The user equipment may also receive downlink HARQ feedback through a downlink carrier having a feedback relationship with the uplink carrier on which PUSCH transmission is performed using the semi-persistent transmission resources. When the PUSCH transmission is performed without using semi-persistent transmission resources (a PDCCH directs uplink transmission), the user equipment receives downlink HARQ feedback through a downlink carrier on which PDCCH reception for uplink transmission is performed (1825).

Eighth Embodiment

The eighth embodiment of the present invention provides a method wherein, when PUSCH transmission is performed using semi-persistent transmission resources, HARQ feedback is received on a downlink carrier through which a signal activating the semi-persistent transmission resources has been received. After receiving a signal activating semi-persistent transmission resources through the PDCCH, the user equipment periodically performs PUSCH transmission through the activated semi-persistent transmission resources. That is, when performing PUSCH transmission through separate semi-persistent transmission resources, the user equipment receives HARQ feedback on a downlink carrier through which a signal activating the semi-persistent transmission resources has been received.

FIG. 19 is a flowchart illustrating UE operation according to the eighth embodiment of the present invention.

Referring to FIG. 19, the user equipment receives a signal activating uplink semi-persistent transmission resources through a downlink carrier (1905). The signal for uplink semi-persistent resource activation has the same format as a regular signal for uplink resource allocation, and activates allocated semi-persistent transmission resources in a given cycle. The user equipment retains information on the downlink carrier through which the signal for uplink semi-persistent resource activation is received to handle downlink HARQ feedback in response to uplink transmission using semi-persistent transmission resources.

The user equipment performs PUSCH transmission through an uplink carrier (1910). The user equipment checks whether the PUSCH transmission is performed using semi-persistent transmission resources (1915). Here, uplink transmission using semi-persistent transmission resources indicates absence of a signal for uplink transmission resource allocation associated with the uplink transmission. When the PUSCH transmission is performed using semi-persistent transmission resources, the user equipment identifies the downlink carrier through which the signal for uplink semi-persistent resource activation is received and receives downlink HARQ feedback for the PUSCH transmission through the identified downlink carrier (1920). When the PUSCH transmission is performed without using semi-persistent transmission resources (a signal for dynamic uplink resource allocation is present), the user equipment receives downlink HARQ feedback through a downlink carrier on which the signal for dynamic uplink resource allocation is received (1925).

Ninth Embodiment

The ninth embodiment of the present invention provides a method wherein, when PUSCH transmission is performed on an uplink carrier, the user equipment receives HARQ feedback on a downlink carrier selected according to the same criterion regardless of whether the uplink transmission is conducted through transmission resources dynamically allocated by the PDCCH or through semi-persistent transmission resources.

In the ninth embodiment, the base station establishes relationships between downlink carriers and uplink carriers aggregated in one user equipment according to an uplink scheduling perspective. Uplink resource allocation information for an uplink carrier and HARQ feedback for uplink transmission are transmitted only on a downlink carrier related in uplink scheduling perspective with the uplink carrier. Relationships in uplink scheduling perspective may be determined by the base station and be notified to the user equipment during a call setup procedure. When the user equipment identifies a downlink carrier related in uplink scheduling perspective with an uplink carrier, it receives HARQ feedback on the identified downlink carrier in response to uplink data sent through the uplink carrier.

Figure 20:
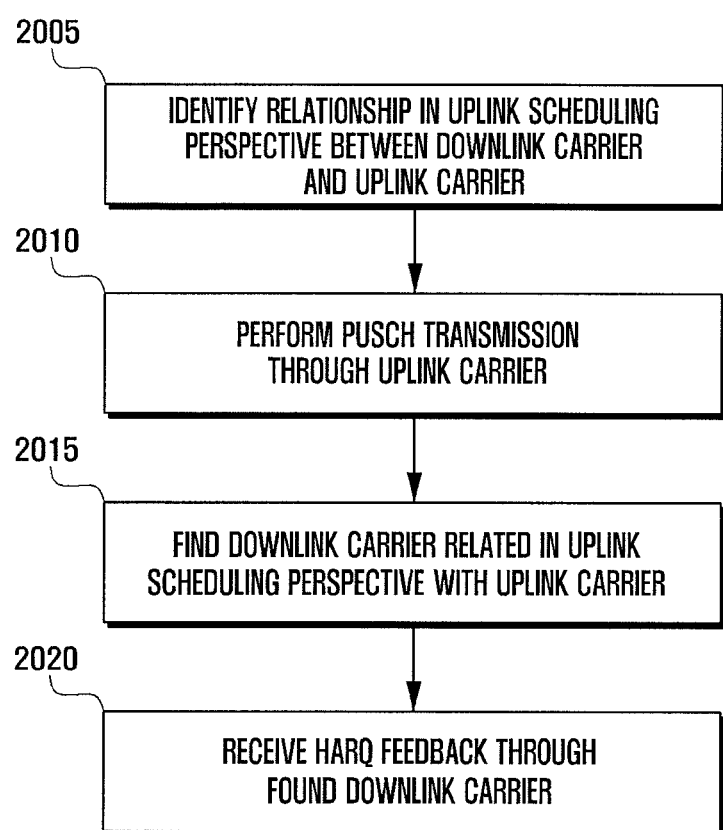
FIG. 20 is a flowchart illustrating UE operation according to a ninth embodiment of the present invention.

FIG. 20 is a flowchart illustrating UE operation according to the ninth embodiment of the present invention.

Referring to FIG. 20, the user equipment receives information regarding relationships in uplink scheduling perspective between downlink carriers and uplink carriers from the base station (2005). This information indicates a downlink carrier related in uplink scheduling perspective with a given uplink carrier. When a downlink carrier is related in uplink scheduling perspective with an uplink carrier, uplink resource allocation information for the uplink carrier and HARQ feedback for uplink transmission through the uplink carrier are transmitted only on the related downlink carrier.

The user equipment performs PUSCH transmission through an uplink carrier (2010). The user equipment identifies a downlink carrier related in uplink scheduling perspective with the uplink carrier on which the PUSCH transmission is performed (2015). Later, the user equipment receives HARQ feedback through the downlink carrier related in uplink scheduling perspective (2020). For reference, in most existing methods, downlink HARQ feedback in response to uplink transmission is received through a downlink carrier on which uplink resource allocation information for the uplink transmission is performed. If a downlink carrier for HARQ feedback is selected as in the existing methods, it is difficult to determine a downlink carrier for receiving HARQ feedback when separate uplink resource allocation information is not present as in the case of semi-persistent resource allocation. In contrast, in the method of the ninth embodiment, relationships in uplink scheduling perspective between downlink carriers and uplink carriers are established in advance. Later, HARQ feedback in response to uplink transmission through an uplink carrier is received through a downlink carrier related in uplink scheduling perspective with the uplink carrier on which the uplink transmission is conducted. Hence, the downlink carrier to receive HARQ feedback can be clearly determined even in the case of uplink transmission using semi-persistent transmission resources.

Figure 21:
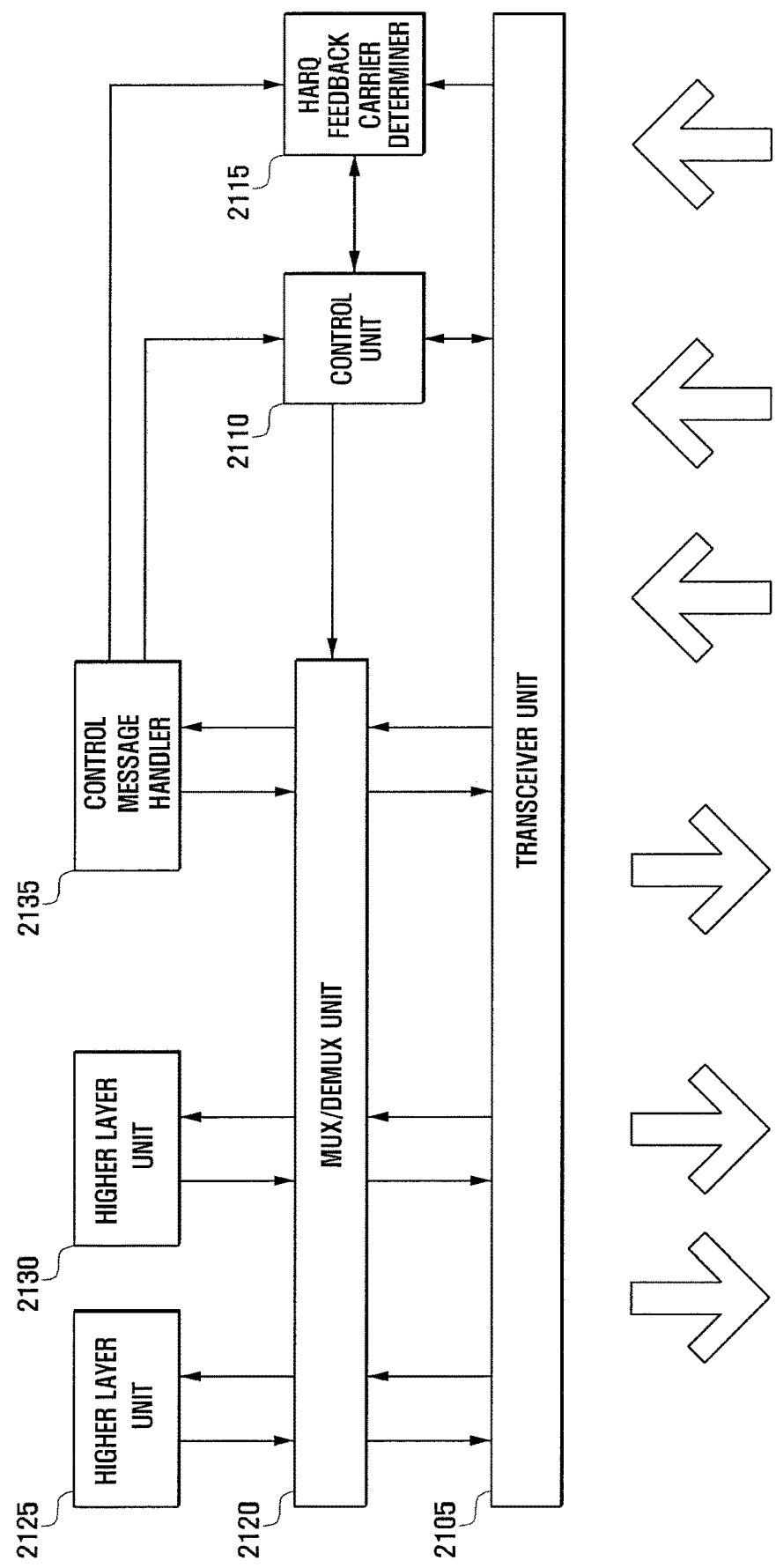
FIG. 21 is a block diagram of the user equipment according to another embodiment of the present invention.

FIG. 21 is a block diagram of the user equipment having a carrier aggregation capability according to another embodiment of the present invention.

Referring to FIG. 21, the user equipment may include a transceiver unit 2105, an HARQ feedback carrier determiner 2115, a control unit 2110, a mux/demux unit 2120, a control message handler 2135, and higher layer units 2125 and 2130.

The transceiver unit 2105 receives data and control signals from a base station through a downlink carrier and sends data and control signals to the base station through an uplink carrier. When carrier aggregation is utilized, the transceiver unit 2105 may send and receive data and control signals through multiple downlink carriers and uplink carriers.

The control unit 2110 controls the transceiver unit 2105 to send uplink traffic or to receive downlink traffic according to a received control signal (such as uplink or downlink resource allocation information). The control unit 2110 notifies the HARQ feedback carrier determiner 2115 of a downlink carrier on which uplink or downlink resource allocation information is received and downlink and uplink carriers scheduled for transmission.

The HARQ feedback carrier determiner 2115 identifies uplink and downlink feedback relationships on the basis of information on relationships between downlink carriers and uplink carriers provided by the control message handler 2135. The HARQ feedback carrier determiner 2115 determines, in response to downlink traffic (uplink traffic), an uplink carrier (a downlink carrier) to be used to send (receive) HARQ feedback on the basis of information provided by the control unit 2110, and controls the transceiver unit 2105 to send (receive) HARQ feedback through the determined uplink carrier (downlink carrier).

In the third embodiment of the present invention, the HARQ feedback carrier determiner 2115 controls the transceiver unit 2105 to receive, in response to uplink transmission on an uplink carrier, downlink HARQ feedback on a downlink carrier through which downlink resource allocation information for the uplink transmission is received. In the sixth embodiment, the HARQ feedback carrier determiner 2115 controls the transceiver unit 2105 to receive, in response to uplink transmission performed using semi-persistent transmission resources, downlink HARQ feedback through a preset downlink carrier such as the primary downlink carrier. In the seventh embodiment, the HARQ feedback carrier determiner 2115 controls the transceiver unit 2105 to receive, in response to uplink transmission performed using semi-persistent transmission resources, downlink HARQ feedback through a downlink carrier associated in path loss with the uplink carrier in which the semi-persistent transmission resources are configured.

The mux/demux unit 2120 multiplexes data coming from the higher layer units 2125 and 2130 or the control message handler 2135, and demultiplexes data received by the transceiver unit 2105 and forwards the demultiplexed data to the higher layer units 2125 and 2130 or the control message handler 2135.

The control message handler 2135 processes a control message received from the network and performs a corresponding operation. For example, the control message handler 2135 forwards information on the uplink or downlink feedback relationship contained in a control message to the HARQ feedback carrier determiner 2115. Specifically, as described in connection with the first to ninth embodiments, the control message handler 2135 analyzes a received control message to identify an uplink or downlink feedback relationship and forwards the analysis results to the HARQ feedback carrier determiner 2115. The higher layer units 2125 and 2130 may be configured on a service basis. The higher layer units 2125 and 2130 delivers user data generated by user applications such as FTP and VoIP to the mux/demux unit 2120, and delivers data coming from the mux/demux unit 2120 to appropriate user applications at the higher layer.

To describe the operation of the user equipment having the above configuration, the transceiver unit 2105 receives and transmits data and control signals through multiple carriers when carrier aggregation is enabled. The transceiver unit 2105 receives data and control signals from the base station through a downlink carrier. The control unit 2110 controls the transceiver unit 2105 to send uplink traffic or to receive downlink traffic according to a received control signal such as uplink or downlink resource allocation information. Here, the mux/demux unit 2120 demultiplexes data received by the transceiver unit 2105 and forwards the demultiplexed data to the higher layer units 2125 and 2130 or the control message handler 2135, and multiplexes signals coming from the higher layer units 2125 and 2130 or the control message handler 2135 and forwards the multiplexed signal to the transceiver unit 2105.

The control message handler 2135 processes a control message received from the network and performs a corresponding operation. For example, the control message handler 2135 forwards information on the uplink or downlink feedback relationship contained in a control message to the HARQ feedback carrier determiner 2115. The HARQ feedback carrier determiner 2115 identifies uplink and downlink feedback relationships on the basis of information on relationships between downlink carriers and uplink carriers provided by the control message handler 2135.

The control unit 2110 notifies the HARQ feedback carrier determiner 2115 of a downlink carrier on which uplink or downlink resource allocation information is received and downlink and uplink carriers scheduled for transmission. The HARQ feedback carrier determiner 2115 determines, in response to downlink traffic (uplink traffic), an uplink carrier (a downlink carrier) to be used to send (receive) HARQ feedback on the basis of the information provided by the control unit 2110, and controls the transceiver unit 2105 to send (receive) HARQ feedback through the determined uplink carrier (downlink carrier).

While the present invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

While the present invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

The invention claimed is:

1. A method performed by a terminal in a wireless communication system, the method comprising:
   receiving, on a downlink carrier of a second cell, a physical downlink control channel (PDCCH) including scheduling information for a physical downlink shared channel (PDSCH) on a downlink of a first cell;
   performing, on the downlink of the first cell, a reception of the PDSCH scheduled based on the scheduling information; and
   transmitting, on an uplink carrier of the first cell, feedback information associated with the reception of the PDSCH.

2. The method of claim 1, wherein the first cell corresponds to a primary cell.

3. The method of claim 1, wherein the feedback information corresponds to a hybrid automatic repeat request (HARQ) ACK/NACK for a physical uplink shared channel (PUSCH).

4. The method of claim 1, wherein the PDSCH is scheduled based on a cross carrier scheduling.

5. The method of claim 1,
   wherein the uplink carrier of the first cell and the downlink carrier of the first cell are associated with a first frequency,
   wherein the downlink carrier of the second cell is associated with a second frequency, and
   wherein the first cell and the second cell are configured to the terminal for a carrier aggregation.

6. A method performed by a base station in a wireless communication system, the method comprising:
   transmitting, on a downlink carrier of a second cell, a physical downlink control channel (PDCCH) including scheduling information for a physical downlink shared channel (PDSCH) on a downlink of a first cell;
   transmitting, on the downlink of the first cell, the PDSCH scheduled based on the scheduling information; and
   receiving, on an uplink carrier of the first cell, feedback information associated with a reception of the PDSCH.

7. The method of claim 6, wherein the first cell corresponds to a primary cell.

8. The method of claim 6, wherein the feedback information corresponds to a hybrid automatic repeat request (HARQ) ACK/NACK for a physical uplink shared channel (PUSCH).

9. The method of claim 6, wherein the PDSCH is scheduled based on a cross carrier scheduling.

10. The method of claim 6,
    wherein the uplink carrier of the first cell and the downlink carrier of the first cell are associated with a first frequency,
    wherein the downlink carrier of the second cell is associated with a second frequency, and
    wherein the first cell and the second cell are configured to a terminal for a carrier aggregation.

11. A terminal in a wireless communication system, the terminal comprising:
    a transceiver; and
    a controller configured to:
       receive, on a downlink carrier of a second cell, a physical downlink control channel (PDCCH) including scheduling information for a physical downlink shared channel (PDSCH) on a downlink of a first cell,
       perform, on the downlink of the first cell, a reception of the PDSCH scheduled based on the scheduling information, and
       transmit, on an uplink carrier of the first cell, feedback information associated with the reception of the PDSCH.

12. The terminal of claim 11, wherein the first cell corresponds to a primary cell.

13. The terminal of claim 11, wherein the feedback information corresponds to a hybrid automatic repeat request (HARQ) ACK/NACK for a physical uplink shared channel (PUSCH).

14. The terminal of claim 11, wherein the PDSCH is scheduled based on a cross carrier scheduling.

15. The terminal of claim 11,
    wherein the uplink carrier of the first cell and the downlink carrier of the first cell are associated with a first frequency,
    wherein the downlink carrier of the second cell is associated with a second frequency, and
    wherein the first cell and the second cell are configured to the terminal for a carrier aggregation.

16. A base station in a wireless communication system, the base station comprising:
    a transceiver; and
    a controller configured to:
       transmit, on a downlink carrier of a second cell, a physical downlink control channel (PDCCH) including scheduling information for a physical downlink shared channel (PDSCH) on a downlink of a first cell,
       transmit, on the downlink of the first cell, the PDSCH scheduled based on the scheduling information, and
       receive, on an uplink carrier of the first cell, feedback information associated with a reception of the PDSCH.

17. The base station of claim 16, wherein the first cell corresponds to a primary cell.

18. The base station of claim 16, wherein the feedback information corresponds to a hybrid automatic repeat request (HARQ) ACK/NACK for a physical uplink shared channel (PUSCH).

19. The base station of claim 16, wherein the PDSCH is scheduled based on a cross carrier scheduling.

20. The base station of claim 16,
   wherein the uplink carrier of the first cell and the downlink carrier of the first cell are associated with a first frequency,
   wherein the downlink carrier of the second cell is associated with a second frequency, and
   wherein the first cell and the second cell are configured to a terminal for a carrier aggregation.

* * * * *